(12) United States Patent
Hirabayashi

(10) Patent No.: US 6,735,876 B2
(45) Date of Patent: May 18, 2004

(54) BLADE CLAMPS SUITABLE FOR RECIPROCATING POWER TOOLS

(75) Inventor: Shinji Hirabayashi, Anjo (JP)

(73) Assignee: Makita Corporation, Aichi (JP)

( * ) Notice: Subject to any disclaimer, the term of this patent is extended or adjusted under 35 U.S.C. 154(b) by 103 days.

(21) Appl. No.: 10/083,639

(22) Filed: Feb. 27, 2002

(65) Prior Publication Data
US 2002/0124419 A1 Sep. 12, 2002

(30) Foreign Application Priority Data

Mar. 1, 2001 (JP) ........................................ 2001-057158
Aug. 6, 2001 (JP) ........................................ 2001-238392

(51) Int. Cl.⁷ .......................... B27B 19/02; B23D 51/10
(52) U.S. Cl. .............................. 30/392; 279/78; 30/339
(58) Field of Search .......................... 30/392–394, 339; 279/77, 78

(56) References Cited

U.S. PATENT DOCUMENTS

| | | |
|---|---|---|
| 3,583,716 A | 6/1971 | Daniel |
| 3,750,283 A | 8/1973 | Hoffman |
| 3,823,473 A | 7/1974 | Hoffman |
| 3,927,893 A | 12/1975 | Dillon |
| 4,299,402 A | 11/1981 | Hoffman |
| 5,103,565 A | 4/1992 | Holzer |
| 5,306,025 A | 4/1994 | Langhoff |
| 5,487,221 A | 1/1996 | Oda |
| 5,575,071 A | 11/1996 | Phillips |
| 5,661,909 A | 9/1997 | Kondo |
| 5,765,463 A | 6/1998 | Okubo |
| 5,903,983 A | 5/1999 | Jungmann |
| 5,946,810 A | 9/1999 | Hoelderlin |
| 5,987,758 A | 11/1999 | McCurry |
| 5,988,034 A | 11/1999 | Okubo |
| 6,101,726 A | 8/2000 | Laverick |

(List continued on next page.)

FOREIGN PATENT DOCUMENTS

| | | |
|---|---|---|
| DE | 4102011 | 12/1991 |
| GB | 2336806 | 11/1999 |
| GB | 2338205 | 12/1999 |
| GB | 2342314 A | 4/2000 |
| WO | WO 97/31745 | 9/1997 |

Primary Examiner—Douglas D. Watts
(74) Attorney, Agent, or Firm—Birch, Stewart, Kolasch & Birch, LLP

(57) ABSTRACT

Blade clamps (26, 110) may reliably secure blades (22) to reciprocating power tools (10). The power tools may include a reciprocating drive shaft (24) partially extending from the tool housing (12). A first end of a rod (37, 112) may be attached to the drive shaft. A second end of the rod may include a blade slot (37a, 112a) defined to receive the blade so that the longitudinal axis of the blade aligns with a longitudinal, reciprocating axis of the drive shaft. An aperture (37b) may be defined substantially perpendicular to the first blade slot and may communicate with the blade slot. A sleeve (33, 115) may be rotatably mounted on the rod so as to pivot between an initial locking position and a blade replacement position. A cam surface (33c, 116) is defined on an inner surface of the sleeve. A stopper (33e, 116d) projects from the cam surface or the rod and defines the blade replacement position. A pushpin (42, 113) may be slidably disposed within the rod aperture so that a contact portion (42b, 113c) of the pushpin slidably contacts the cam surface. The pushpin may contact the first stopper in the blade replacement position and prevent the sleeve from pivoting beyond the blade replacement position. A collar (52, 130) may be pivotally coupled to the tool housing and at least partially surround the sleeve and the reciprocating drive shaft. The collar may include a manually operable tab (52b, 130b) formed on an outer surface. When the collar is manually pivoted in an opening direction, the collar engages the sleeve and causes the sleeve to rotate toward the blade replacement position. When the collar is returned to a closed position, the sleeve disengages from the collar.

31 Claims, 20 Drawing Sheets

U.S. PATENT DOCUMENTS

| | | |
|---|---|---|
| 6,112,420 A | 9/2000 | Schickerling |
| 6,178,646 B1 * | 1/2001 | Schnell et al. ................ 30/392 |
| 6,209,208 B1 | 4/2001 | Marinkovich |
| 6,233,833 B1 | 5/2001 | Grant |
| 6,260,281 B1 | 7/2001 | Okumura |
| 6,276,065 B1 * | 8/2001 | Osada et al. .................. 30/392 |
| 2002/0014014 A1 | 2/2002 | Dassoulas |
| 2002/0017026 A1 | 2/2002 | Kakiuchi |
| 2002/0026718 A1 | 3/2002 | Eichberger |

* cited by examiner

BLADE CLAMPS SUITABLE FOR RECIPROCATING POWER TOOLS

This application claims priority to Japanese patent application serial numbers 2001-57158 and 2001-238392, the contents of which are hereby incorporated by reference.

BACKGROUND OF THE INVENTION

1. Field of the Invention

The present invention relates to a blade clamping devices that can be utilized, e.g., with jigsaws and other reciprocating tools.

2. Description of the Related Art

A known blade clamping device for a jigsaw is taught in U.S. Pat. No. 5,306,025. This blade clamping device affixes a saw blade to a reciprocating drive shaft or plunger. The blade clamping device includes a centering sleeve that extends from the drive shaft and the centering sleeve includes an external threaded section. A clamping sleeve is rotatably mounted on the external threaded section of the centering sleeve. By rotating the clamping sleeve about the longitudinal axis of the drive shaft and the centering sleeve, the blade clamping device can be moved from a blade locking position (blade clamping position) to a blade replacement position. In the blade replacement position, the saw blade can be removed from the blade clamping device and a new saw blade can be inserted into the blade clamping device. The blade clamping device is then locked in the blade locking position by rotating the clamping sleeve back to the blade locking position. A torsion spring normally biases the clamping sleeve towards the blade locking position.

A connecting bush (collar) is rotatably mounted around the clamping sleeve. The connecting bush includes a gripping member (tab) that extends through an aperture defined in the jigsaw housing. The connecting bush is operably coupled to the clamping sleeve, such that rotating or pivoting the gripping member with respect to the jigsaw housing will cause the clamping sleeve to rotate. However, during a sawing operation, the connecting bush does not contact the clamping sleeve. Therefore, the blade clamping device can freely reciprocate together with the drive shaft without interference from the connecting bush. Further, the gripping member allows the operator to rotate or pivot the clamping sleeve to the blade replacement position without directly touching the clamping sleeve.

However, the clamping sleeve of U.S. Pat. No. 5,306,025 can rotate past the blade replacement position (i.e., the rotational range of the clamping sleeve is not restricted). Therefore, in order to remove the saw blade from the blade clamping device, the clamping sleeve must be accurately and precisely rotated to the blade replacement position, so that the saw blade receiving slots within the blade clamping device will properly align. If the clamping sleeve is not accurately and precisely positioned in the blade replacement position, the saw blade can not be easily removed from the blade clamping device, because the blade slots are not aligned, and thus, a saw blade can not be inserted into or removed from the blade clamping device.

In order to accurately define the blade replacement position, the aperture in the jigsaw housing is designed so that the gripping member of the connecting bush abuts an edge of the aperture when the clamping device reaches the blade replacement position. Thus, the aperture of the jigsaw housing is designed to limit the pivotal range of the clamping sleeve, so that the clamping sleeve will stop at the blade replacement position.

Consequently, the relative positional relationships of the clamping sleeve, the connection bush, the gripping member and the jigsaw housing aperture are critical for accurately determining the blade replacement position. If all of these structures are not accurately manufactured and/or accurately positioned during assembly, it may be difficult or impossible to accurately position the blade clamping device in the blade replacement position. Therefore, this known design suffers a significant drawback in being difficult to accurately and reliably design and manufacture.

SUMMARY OF THE INVENTION

It is, accordingly, one object of the present teachings to teach blade clamps or blade clamping devices that facilitate accurate and reliable positioning of the blade replacement position using relatively simple structures. Such blade clamps may be advantageously utilized with blades having positioning projections (or dogs) extending from respective sides of the blade, although the present teachings are not limited to such blades.

Thus, in one embodiment of the present teachings, jigsaws are taught as representative examples of reciprocating power tools that are particularly suited for the present blade clamps. Naturally, the present teachings are not limited to jigsaws and the present blade clamps can be advantageously utilized in a variety of applications and with a variety of tools.

Generally speaking, jigsaws may include a housing, a reciprocating drive shaft driven by a motor, a blade clamp and a saw blade. The drive shaft is also known in the art as a plunger or a spindle and such terms are interchangeable. In one embodiment of the present teachings, the blade clamp may include a tab that can be manually rotated or pivoted by the operator of the jigsaw. Further, the blade clamp may preferably include a stopper that accurately stops the blade clamp in the blade replacement position. Therefore, it is not necessary to utilize an aperture in the jigsaw housing as a means for accurately stopping the blade clamp in the blade replacement position. Instead, the stopper is preferably disposed internally within the blade clamp and thus, can more reliably and accurately position the blade clamp in the blade replacement position than known blade clamps. Consequently, the blade replacement position is not determined by the relative positional relationships of the tab or gripper member and the aperture of the power tool housing, thereby enabling the construction of more reliable blade clamping devices.

Optionally, the jigsaw may include an electric motor that serves as a drive source for the drive shaft. Further, a transmission optionally may be included to convert rotational movement of the drive source into substantially linear reciprocating movement of the drive shaft. A variety of drives sources and transmissions may be utilized with the present teachings and the present blade clamps are not limited to any particular drive source and/or transmission.

The present blade clamps may be affixed to a distal end of the drive shaft. Further, the present blade clamps may generally include a rod, a pushpin, and a rotatable sleeve. Further, a pivotable or rotatable collar may be disposed around the rotatable sleeve and preferably may be pivotally coupled to the housing. The collar may selectively engage the rotatable sleeve so as to rotate the blade clamp to the blade replacement position. The collar may preferably include a tab or other gripping member that permits the operator to manually manipulate the collar in order to rotate or pivot to the collar, and thereby pivot or rotate the blade clamp to the blade replacement position.

In one embodiment of the present teachings, the rod may be affixed to a lower or distal end of the drive shaft. A blade receiving portion (recess) may be defined within the rod. A base end of the blade may be inserted into the blade receiving portion so that the longitudinal axis of the blade is continuous, or substantially continuous, with the longitudinal axis (i.e., the reciprocating axis) of the drive shaft. The blade receiving portion may be arranged and constructed to as to be capable of receiving blades having a variety of different thickness. Further, a slot preferably extends from the blade receiving portion along the longitudinal axis of the rod. The slot is preferably designed to guide the blade into the blade receiving portion and to support the blade during operation.

In another embodiment of the present teachings, the rod may include an aperture that extends in a lateral direction of the rod (i.e., a direction perpendicular to the longitudinal or reciprocating axis of the rod). Further, the aperture preferably communicates with the rod slot and the aperture is preferably defined substantially perpendicular to the rod slot. A pushpin may be slidably disposed within the aperture. For example, the distal end of the pushpin may be selectively moved so as to contact or abut a side face of the blade when the blade has been inserted into the rod slot and blade receiving portion of the rod. Therefore, the pushpin can fix the position of the blade within the blade slot, so that the blade does not move or wobble during a sawing operation.

In another embodiment, the sleeve is preferably rotatably mounted around the rod such that the sleeve can rotate or pivot about the longitudinal axis of the rod (or drive shaft). The distal end of the sleeve preferably includes an opening (e.g., a slot) designed to receive the blade. For example, the sleeve opening is preferably designed so that the blade projections may pass through the sleeve opening and into the blade receiving portion of the rod. Further, the sleeve preferably rotates or pivots about the longitudinal axis between a blade locking position (e.g., a blade clamping position) and the blade replacement position. As noted above, the collar and sleeve are preferably arranged and constructed such that rotation or pivoting of the collar will cause the sleeve to rotate or pivot. That is, the collar selectively engages the sleeve in order to rotate or pivot the sleeve to the blade replacement position.

In another embodiment, a cam surface is preferably defined on an inner surface of the sleeve. Further, the cam surface is preferably designed to slidably contact or abut a head portion of the pushpin. In addition, the cam surface is preferably designed such that rotation of the sleeve in a first direction causes the pushpin to extend further into the rod aperture and the blade slot. Thus, rotation of the cam surface in the first direction urges the pushpin towards the blade, so as to lock or clamp the blade within the blade slot of the rod.

On the other hand, rotation of the sleeve in a second (opposite) direction preferably permits the pushpin to withdraw from the blade slot defined in the rod so as to permit a blade to be withdrawn from or inserted into the blade slot. As a result, when the sleeve (and thus the cam surface) rotate in the second direction about the longitudinal axis of the rod, the pushpin may be withdrawn from the blade slot and release contact with the side face of the blade that is inserted in the blade slot.

In another embodiment of the present teachings, a first stopper is preferably disposed on the sleeve in order to accurately define the blade replacement position of the blade clamp. For example, the first stopper preferably restricts the sleeve from further rotating or pivoting in relation to the rod when the blade replacement position has been reached. In one representative embodiment, the first stopper may be defined on the cam surface of the sleeve. In another representative embodiment, the first stopper may be defined on an outer surface of the rod.

In another embodiment, the collar preferably includes a tab or other gripping member that enables the operator to manually rotate or pivot the collar with respect to the housing. Therefore, the operator can manually rotate or pivot the tab when the operator wishes to remove and/or change the blade. Preferably, when the sleeve is disposed in the initial position and/or the blade locking or clamping position, the blade receiving portion and blade slot of the rod do not align with the sleeve opening (slot). Therefore, the blade projections can not pass through the sleeve opening and the blade can not be removed from the blade clamp. Moreover, if a blade is not inserted into the blade clamp when the blade clamp is disposed in the initial position, a blade can not be inserted into the blade slot and the blade receiving portion, because the sleeve opening is not aligned with the blade slot and the blade receiving portion.

On the other hand, when the sleeve is disposed in the blade replacement position, the blade slot and the blade receiving portion of the rod preferably align with the sleeve opening (slot). Therefore, the blade projections can easily pass through the sleeve opening of the sleeve and the blade can be inserted into or removed from the blade slot of the blade clamp.

If a first stopper is utilized to restrict the sleeve from pivoting or rotating past the blade replacement position, the sleeve can be accurately positioned in the blade replacement position by simply adjusting the positional relationship between the sleeve and the rod. In this case, the collar tab or gripper member is only required to pivot or rotate the sleeve. The positional relationship of the collar tab with respect to the sleeve (or an aperture in the tool housing) is not significant. Therefore, the sleeve can be accurately and reliably positioned in the blade replacement position without requiring the positional relationship of the housing, the collar, the rod, the sleeve, etc. to be accurately defined.

When the blade clamp is returned to the blade locking position after blade replacement, the distal portion of the sleeve prevents the blade projections from passing through the sleeve opening. Therefore, the blade is reliably retained within the blade clamp. As noted above, when the sleeve is rotated or pivoted toward the initial position, the cam surface of the sleeve pushes or urges the pushpin toward the side face of the blade. Consequently, the blade is reliably and firmly retained between the pushpin and a wall surface of the blade slot, which wall surface is defined within the rod. The sleeve fixes the blade in the clamped or locked state when the sleeve pivots or rotates from the blade replacement position towards the initial position.

As noted above, the sleeve is preferably biased or urged toward the initial position. For example, a torsion spring may be disposed around the rod and may be coupled to the sleeve so as to bias the sleeve toward the initial position. The torsion spring may therefore impart a force to the pushpin, which force will reliably retain the blade between the pushpin and the side wall of the blade slot. By using a torsion spring disposed around the rod, the length of the blade clamp along the axial direction of the drive shaft can be minimized.

The sleeve optionally also may include a second stopper. The second stopper also may restrict the pivotal range of the sleeve with respect to the rod. For example, the second stopper may be disposed in a position, so that the sleeve will be prevented from pivoting past the initial position. That is, the second stopper may define the initial position. If the second stopper restricts the pivotal range of the pushpin (and thus the sleeve), the collar and the sleeve can be designed such that the collar will not contact the sleeve in the initial position as well as the blade locking position. Therefore, if the jigsaw is accidentally started without attaching a blade to the blade clamp, the collar and the sleeve will not be damaged.

Thus, the first stopper may be defined at one end of the cam surface (or the outer surface of the rod), so that the first stopper will contact or abut the pushpin when the sleeve reaches the blade replacement position. Further, the second stopper may be defined at the other end of the cam surface (or the outer surface of the rod), so that the second stopper will contact or abut the pushpin when the sleeve reaches the initial position.

In another embodiment of the present teachings, the cam surface of the sleeve is preferably designed so as to not actively push or urge the pushpin when the sleeve rotates or pivots from the blade replacement position to a push start position. The push start position may be defined at a predetermined angle displaced from the blade replacement position. Thereafter, the cam surface will push or urge the pushpin when the sleeve is rotated or pivoted past the push start position towards the initial position.

The rotation angle of the cam surface may include a range of play. In this range, the cam does not push or urge the pushpin toward the side surface of the blade when the sleeve rotates or pivots between the blade replacement position and the push start position. Thus, as the sleeve rotates or pivots from the blade replacement position to the push start position, the pushpin is preferably not urged or biased to contact the side surface of the blade, which has been inserted into the blade slot and the blade receiving portion. Therefore, rotation of the sleeve is not restricted between the blade replacement position and the push start position. As a result, the sleeve can be reliably rotated or pivoted as far as the push start position regardless of the thickness of the blade and the sleeve will support the blade projections to prevent the blade from falling out of the blade clamp.

If the blade is thick and the cam surface does not include a range of play within rotational angle, the pushpin may contact the blade before the sleeve has sufficiently rotated toward the blade locking position. Consequently, further rotation of the sleeve may be restricted or prevented and the blade may not be securely retained within the blade clamp. The provision of a range of play ensures that the sleeve can sufficiently rotate so as to prevent the blade from dropping out of the sleeve opening.

When the sleeve is further rotated or pivoted beyond the push start position toward the initial position (i.e., toward the blade locking position), a friction angle may defined between (1) a common normal at a contact point of the cam surface and the pushpin and (2) a line passing through the contact point and the rotational center of the cam surface. The friction angle from the push start position to the initial position is preferably within the range of 12–16°. In other words, the fiction angle is defined between a common tangent at the contact point and a straight line perpendicular to a line passing through the contact point and the center of rotation of the cam. As the friction angle increases, the force exerted against the pushpin (i.e., the blade clamping force) decreases, thereby reducing the possibility that the pushpin will catch the cam surface. A friction angle within the range of 12–16° provides (1) sufficient clamping force for the blade within the angle range in which the sleeve pivots from the push start position and (2) also prevents the pushpin from catching on the cam surface.

In another aspect of the present teachings, a rounded portion of the sleeve opening (aperture) preferably includes a tapered face that is preferably defined to guide the blade into the blade slot. Thus, when the sleeve rotates from the blade replacement position to the push start position, the base end of the blade will be guided along the tapered face. Accordingly, the base end of the blade will be correctly positioned within the blade receiving portion and the sleeve can smoothly rotate.

In another aspect of the present teachings, a gap between the sleeve and the rod may be sealed with a sealing member. The sealing member may preferably include a lock portion. The rod may include a groove for receiving the lock portion. When the lock portion is fitted into the groove, the sealing member is prevented from separating from the gap between the rod and the sleeve.

In another aspect of the present teachings, the cam surface of the sleeve is preferably treated or coated in order to prevent the cam surface from seizing to the pushpin, thereby ensuring that the sleeve can smoothly rotate or pivot. For example, the cam surface may be coated with electroless nickel plating.

These aspects and features may be utilized singularly or in combination in order to make improved blade clamping or blade fastening devices, including but not limited to blade clamps suitable for use with jigsaws. In addition, other objects, features and advantages of the present teachings will be readily understood after reading the following detailed description together with the accompanying drawings and the claims. Of course, the additional features and aspects disclosed herein also may be utilized singularly or in combination with the above-described aspects and features.

BRIEF DESCRIPTION OF THE DRAWINGS

FIG. 23(*b*) shows the position of a cam surface when the collar is disposed in the opened position and the blade guide (sleeve) is disposed in the blade replacement position.

FIG. 24(*b*) shows the position of the cam surface when the collar and the blade guide (sleeve) are both disposed in the push start position.

FIG. 25(*b*) shows the position of the cam surface when the collar and the blade guide (sleeve) are both disposed in the blade locked position.

FIG. 26(*b*) shows the position of the cam surface when the collar is disposed in the closed position.

DETAILED DESCRIPTION OF THE INVENTION

Figure 1:
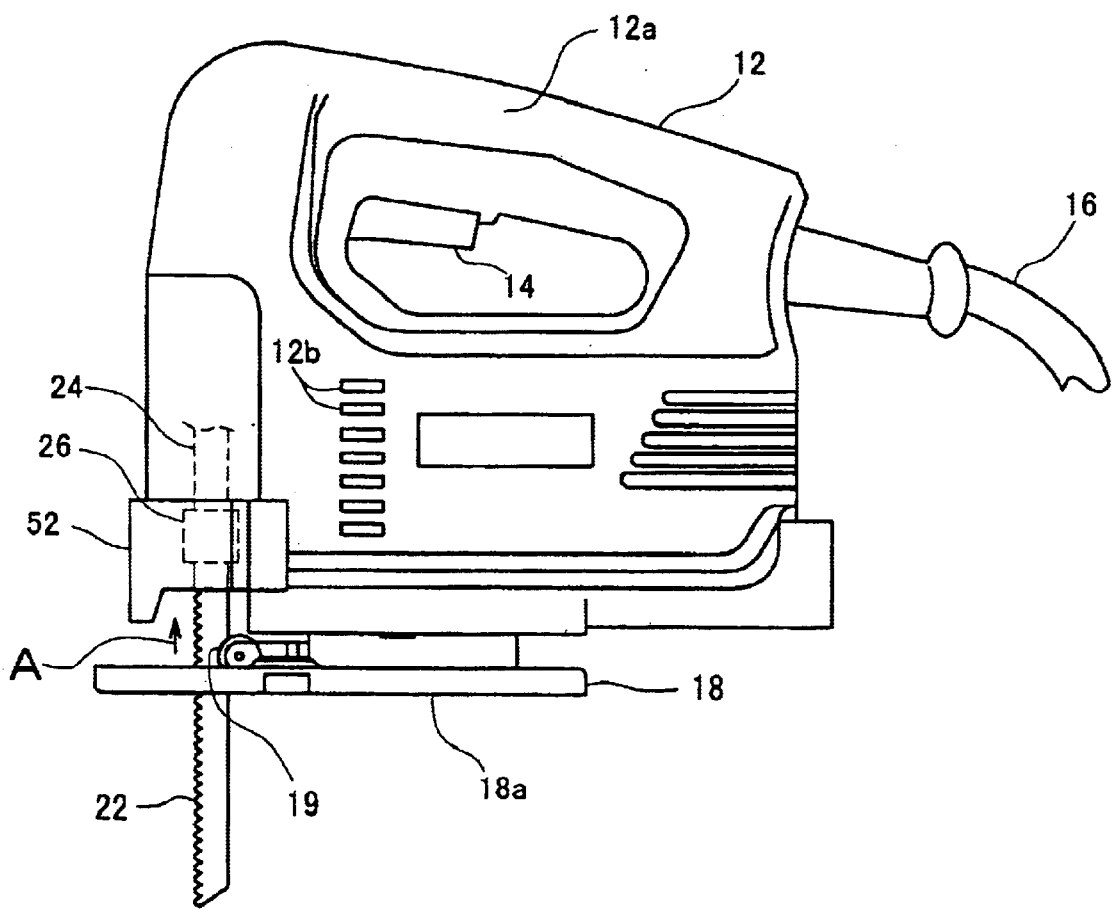
FIG. 1 is a side view of a jigsaw according to a first representative embodiment.

In one embodiment of the present teachings, apparatus are taught for affixing a blade having a pair of side projections to a drive shaft of a tool. For example, a rod may be designed to be attached to a lower end of the drive shaft. The rod may have a blade slot for receiving a base end of the blade so that the longitudinal axis of the blade aligns with a longitudinal axis of the drive shaft. The rod also may have an aperture disposed substantially perpendicular to the blade slot and communicating with the blade slot.

A blade guide (or sleeve) may be rotatably mounted on the rod. The blade guide may include a blade opening and a blade slot that are designed to allow the blade projections to pass therethrough. A cam surface may be defined on an inner surface of the blade guide. A first stopper may project from one end of the cam surface or from the outer surface of the rod, thereby defining a blade replacement position.

A pushpin (or pressing member) may be slidably disposed within the aperture of the rod. The pushpin may include a head portion that slidably contacts the cam surface of the blade guide. The position of the pushpin with respect to a direction perpendicular to the longitudinal axis of the rod may be influenced by the rotational position of the cam surface. The pushpin may contact the first stopper so as to prevent the blade guide from pivoting beyond the blade replacement position.

A spring (e.g., a torsion spring) may bias the blade guide away from the blade replacement position and toward an initial position (i.e., toward a blade locking or clamping position). Optionally, a second stopper may project from a second end of the cam surface or from the outer surface of the rod, thereby defining the initial position and the pivotal range of the pushpin (and thus the blade guide). The second stopper may contact the pushpin when a blade is not inserted in the blade guide in order to limit further pivotal movement of the blade guide with respect to the rod. In another embodiment, the cam surface may optionally be defined to prevent the pushpin from actively pressing the blade when the blade guide pivots from the blade replacement position toward a push start position. The push start position may be a predetermined angle displaced from the blade replacement position. The cam surface then may preferably push or urge the pushpin when the blade guide pivots past the push start position toward the blade locking position. A friction angle may be defined between (1) a common normal at a contact point of the cam surface and the pushpin and (2) a line passing through the contact point and the rotational center of the cam surface. In one preferred embodiment, the friction angle from the push start position to the blade locking position is between about 12–16°.

A portion of a rounded edge of the blade slot may be tapered in order to guide the blade into the blade slot of the rod. Further, the pushpin may include a tapered surface disposed so as to contact the blade as the blade is being inserted into the blade slot. Optionally, the pushpin and rod aperture may be designed so that the pushpin does not rotate within the rod aperture.

In another embodiment, a collar may be pivotally coupled to a housing of the tool. The collar may include a tab (projection) designed for manual manipulation and a hook that can engage a tab (projection) defined on the blade guide. Preferably, the collar hook will engage the blade guide tab when the collar is rotated or pivoted in an opening direction so as to cause the blade guide to rotate or pivot towards the blade replacement position. Further, the collar hook preferably disengages from the blade guide tab when the collar is disposed in a closed position.

In another embodiment of the present teachings, reciprocating power tools may include a reciprocating drive shaft partially extending from a tool housing. A first end of a rod may be attached to the drive shaft. A second end of the rod may include a first blade slot defined to receive a blade so that a longitudinal axis of the blade aligns with a longitudinal, reciprocating axis of the drive shaft. An aperture may be disposed substantially perpendicular to the first blade slot and preferably communicates with the blade slot.

A sleeve may be rotatably mounted on the rod. The sleeve may include a collar engaging means defined on an outer surface of the sleeve. Preferably, the sleeve can pivot between an initial position and a blade replacement position. A blade locking or clamping position is defined between the initial position and the blade replacement position based in part upon the thickness of the blade inserted into the first blade slot. A second blade slot may be defined within the sleeve so as to prevent the blade from passing when the sleeve is disposed in the blade locking position. Further, the second blade slot may be defined so as to permit the blade to pass when the sleeve is disposed in the blade replacement position. A cam surface may be defined on an inner surface of the sleeve.

A first stopper may project from either one end of the cam surface or from the rod. In either case, the first stopper preferably defines the blade replacement position.

A pressing member or pushpin may be slidably disposed within the rod aperture. The pressing member may include a contact portion that slidably contacts the cam surface. Further, the cam surface preferably urges the pressing member further into the rod aperture and the rod blade slot when the sleeve is pivoted toward the blade locking position. Also, the pressing member preferably contacts the first stopper in the blade replacement position. In this case, the sleeve is reliably prevented from pivoting beyond the blade replacement position.

A collar may be pivotally coupled to the tool housing, so as to at least partially surround the sleeve and the reciprocating drive shaft. A manually operable tab (projection) may be formed on an outer surface of the collar. A sleeve engaging means may be defined on an inner surface of the collar. Optionally, the collar engaging means may engage the sleeve engaging means when the collar is manually pivoted in an opening direction. In this case, the sleeve will pivot or rotate toward the blade replacement position. Further, the collar engaging means preferably disengages from the sleeve engaging means when the collar is returned to a closed position. In that case, the sleeve will not contact the collar during operation of the power tool.

Each of the additional features and method steps disclosed above and below may be utilized separately or in conjunction with other features and method steps to provide improved blade clamps and methods for making and using the same. Detailed representative examples of the present teachings, which examples will be described below, utilize many of these additional features and method steps in conjunction. However, this detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the present teachings in the broadest sense, and are instead taught merely to particularly describe representative and preferred embodiments of the present teachings, which will be explained below in further detail with reference to the figures. Of course, features and steps described in this specification and in the dependent claims may be combined in ways that are not specifically enumerated in order to achieve other novel embodiments of the present teachings and the present inventors contemplate such additional combinations.

First Detailed Representative Embodiment

FIG. 1 shows a first detailed representative embodiment of a jigsaw 10 and blade clamp 26 according to the present teachings. A housing 12 accommodates a motor (not shown), which serves as a drive source, and a transmission mechanism (not shown), which converts rotation of the motor into linear, or substantially linear, reciprocating motion of a drive shaft (or spindle) 24. A power source cord 16 supplies power to the jigsaw 10 and extends from the rear end of the housing 12. A handle 12a is defined along the upper portion of the housing 12. A trigger switch 14 is disposed on an inner portion of the handle 12a. The trigger switch 14 is actuated when pressed and current is supplied to the motor when the switch 14 is actuated.

A base or shoe 18 is attached to the bottom of the housing 12. The underside 18a of the base 18 is flat, or substantially flat, and supports the jigsaw 10 relative to a workpiece that will be cut. A U-shaped opening is defined in the base 18 such that the base 18 is open at the front. A blade 22 vertically reciprocates through the U-shaped opening. In order to cut a workpiece, such as a piece of wood, the underside 18a of the base 18 is pressed against the surface of the piece of wood and the jigsaw 10 is moved forward.

A back roller 19 is disposed below the housing 12 and near the blade 22. A groove (not shown) is formed around the cylindrical surface of the back roller 19. The rear edge of the blade 22 fits within the groove. The back roller 19 receives a rearward acting force applied by the blade 22 during a sawing operation.

Figure 17:
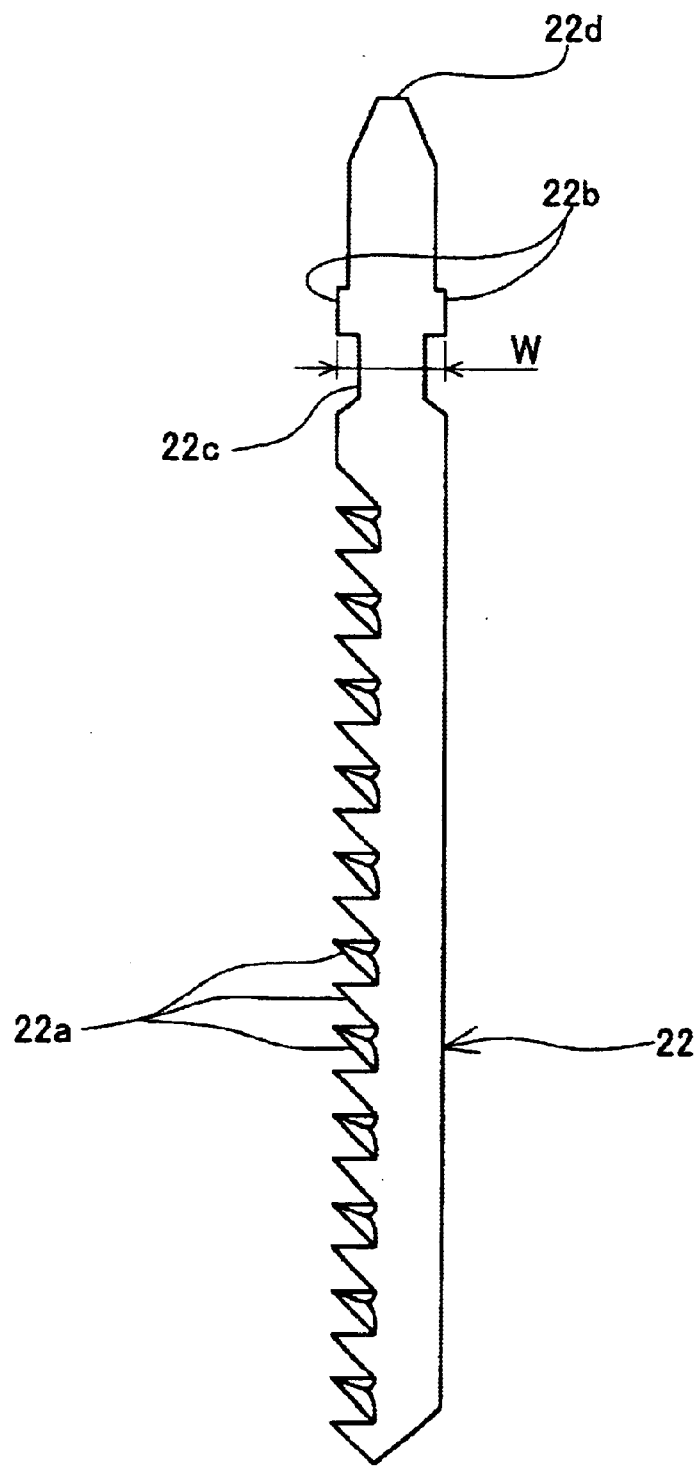
FIG. 17 is a side view of a representative blade.

A representative blade 22 will now be described in further detail. FIG. 17 shows a side view of the blade 22, which includes a series of teeth 22a that serve to cut a workpiece when the blade 22 vertically reciprocates. The upper end 22d of the blade 22 may have a trapezoidal shape and two projections (or dogs) 22b outwardly extend from the blade 22. A recess 22c is defined adjacent to each respective projection 22b. When the blade 22 is attached to the blade clamp 26, the projections 22b function to prevent the blade 22b from dislodging from the blade clamp 26, as will be further discussed below.

The blade 22 may have a variety of thickness, such as 0.9 mm, 1.8 mm, etc. Generally speaking, the thickness of the blade 22 is selected according to the workpiece that will be cut and according to the manner in which the sawing operation will be performed, e.g., high speed sawing, fret sawing, etc. Thus, as further discussed below, the present blade clamps can easily accommodate blades having a variety of thickness so that the power tool can be utilized for a variety of applications.

The structure of the blade clamp 26, including a collar (or manipulation member or release device) 52, will now be described in further detail with reference to FIGS. 2–16. Blade clamp 26 is also generally known in the art as a "keyless" or "tool-less" blade clamp. Because other portions of the jigsaw 10 may be constructed using known parts and structures, description of such other portions is not required herein.

Figure 2:
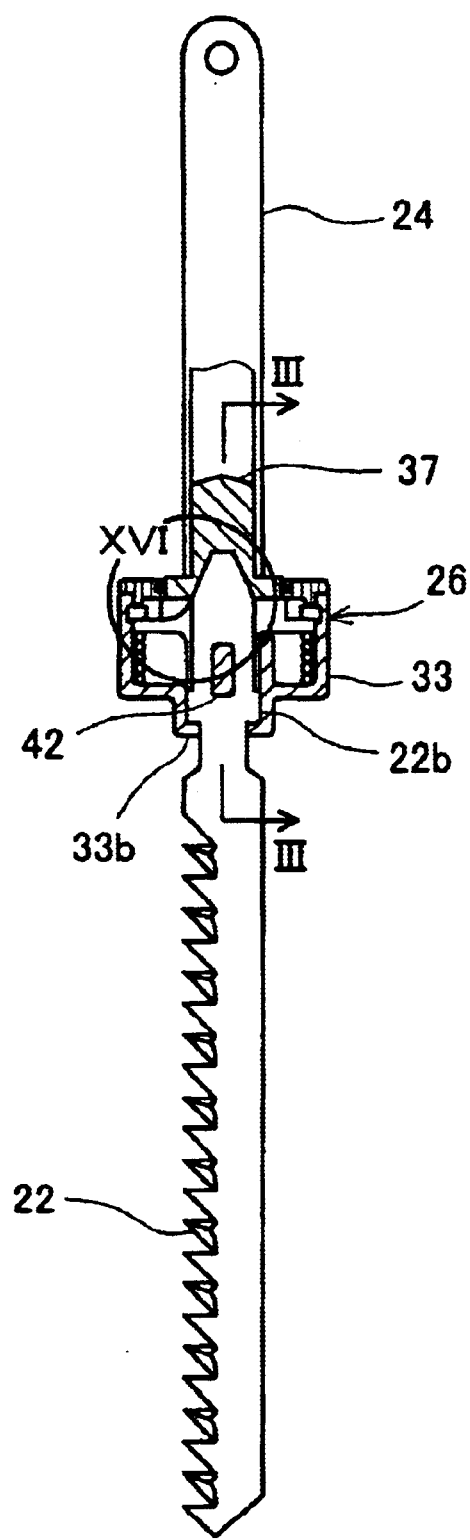
FIG. 2 is a cross-sectional view showing a representative blade clamp when a blade is disposed within the blade clamp.

As shown in FIG. 2, the blade clamp 26 may be secured or affixed to the lower end of the drive shaft 24. The blade clamp 26 preferably serves to secure or affix the removable blade 22 to the drive shaft 24. The upper end of the drive shaft 24 may be coupled to a transmission (not shown) disposed within the housing 12, as discussed above. The transmission preferably generates the linear (or substantially linear) reciprocating motion that is transmitted to the blade 22 via the drive shaft 24. The transmission also may generate a reciprocating orbiting movement, as is well known in the art.

Figure 3:
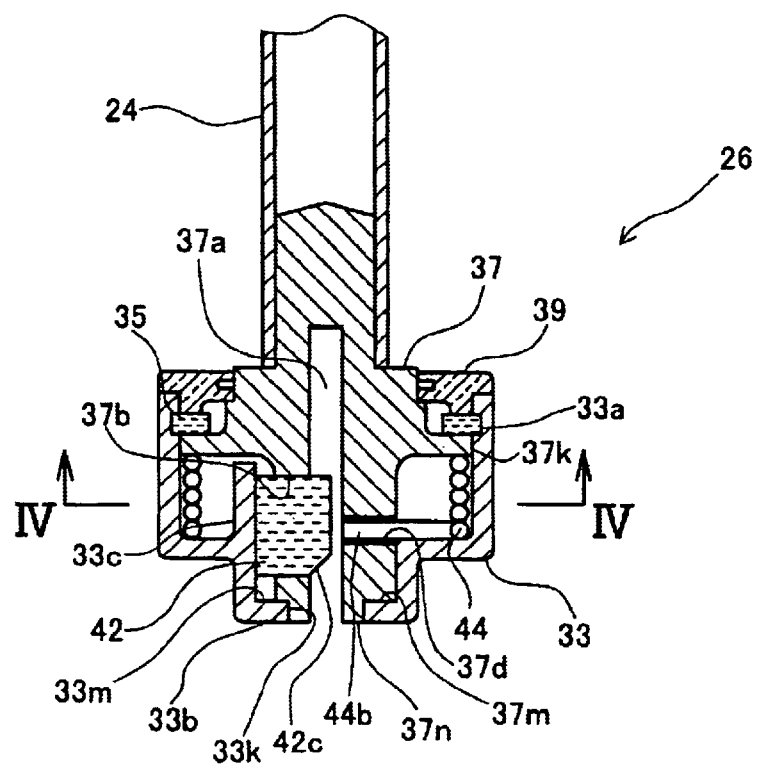
FIG. 3 is a cross-sectional view of the blade clamp when the blade is not attached to the blade clamp and a blade guide (sleeve) is disposed in the initial position.
Figure 4:
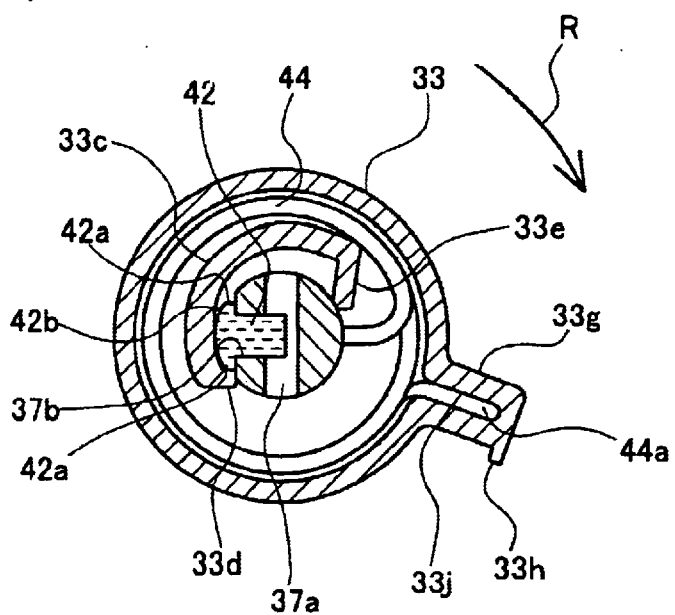
FIG. 4 is a cross-sectional view taken along line IV—IV of FIG. 3.

Referring to FIGS. 2–4, the blade clamp 26 may include a rod (or blade carrier) 37, a pushpin 42, a torsion spring 44 and a blade guide (or sleeve) 33. In the present specification, the terms "blade guide" and "sleeve" are used interchangeably and no difference in meaning is intended. Further, a pushpin is one type of pressing member (or blade pressing means) and a torsion spring is one type of biasing member (or biasing means) suitable for the present teachings. FIG. 2 shows the blade 22 mounted within the blade clamp 26; FIGS. 3 and 4 show the blade clamp 26 without the blade 22.

Figure 16:
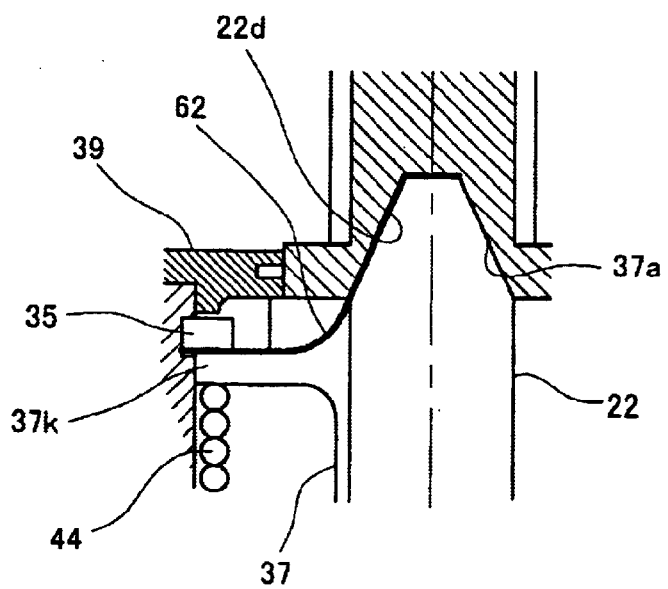
FIG. 16 is an enlarged view of the portion within circle XVI shown in FIG. 2.

The base end of the rod 37 is secured to the lower end of the drive shaft 24. As shown in FIGS. 3 and 4, a rectangular-shaped blade slot (blade receiving portion) 37a is defined in the rod 37. As shown in FIG. 3, the slot 37a extends upward from the lower end of the rod 37 and the slot 37a is designed to receive the blade 22. That is, the slot 37a extends along the longitudinal (or reciprocating) axis of the rod 37. As shown in FIG. 16, a first end of a leaf spring (or plate spring) 62 may be disposed within the slot 37a and a second end of the spring 62 may be disposed between a snap ring 35 and a flange 37k. Upon insertion of the blade 22 into the slot 37a, the leaf spring 62 is compressed by the upper face 22d of the blade 22 and then downwardly biases the blade 22. That is, spring 62 preferably biases the blade 22 in a direction that will eject the blade 22 from the blade clamp 26. Further, as discussed below, when the blade guide 33 is disposed in the blade locked position, the spring 62 biases the blade projections 22b against an upper surface of a lower end 33b of the blade guide 33. Thus, the position of the blade 22 along the longitudinal axis of the rod 37 is reliably secured.

Referring back to FIGS. 3 and 4, a rectangular-shaped aperture 37b also may be defined in the rod 37. The aperture 37b extends from the outer surface of the rod 37 into the slot 37a. Because the pushpin 42 is inserted into or through the aperture 37b, the cross-section of the pushpin 42 optionally may correspond to the cross-section of the aperture 37b. In that case, the pushpin 42 can move perpendicular to the axis of the drive shaft 24 (see FIG. 3), but the pushpin 42 will not rotate within the aperture 37b. Although the cross-sections of the aperture 37b and pushpin 42 are preferably rectangular-shaped, other polygonal shapes or substantially curved shapes (e.g., circular or oval) may be advantageously utilized. In one optional embodiment, the aperture 37b slidably supports movement of the pushpin 42 into and out of the slot 37a, but the (rotational) orientation of the pushpin 42 does not change during operation.

The head 42b of the pushpin 42 preferably contacts a cam surface 33c of the blade guide (sleeve) 33. When the cam surface 33c rotates towards the initial position (i.e., towards the blade locked position), the pushpin 42 is pushed or urged towards the slot 37a. As shown in FIG. 4, the head 42b preferably includes contact portions 42a that outwardly project from the pushpin 42 and extend in the direction of the periphery of the rod 37. As shown in FIG. 3, an inclined plane 42c may be defined within the lower portion of the pushpin 42. When the blade 22 is inserted into the slot 37a, the blade 22 will contact the inclined plane 42c and push or urge the pushpin 42 back toward the cam surface 33c. Therefore, the blade 22 can push the pushpin 42 out of the slot 37a, so that the blade 22 can be inserted into the slot 37a.

Referring to FIGS. 2 and 3, the blade guide 33 preferably is defined by a shape that includes a substantially cylindrical large-diameter portion, which may contact a dust-resistant cover 39 (described further below), and a substantially cylindrical small-diameter portion, which may contact the blade 22. These two portions are preferably integrally connected together in one piece and, as shown in FIGS. 2 and 3, the large-diameter portion is preferably disposed above the small-diameter portion.

Referring to FIGS. 11–14, a round or circular aperture 33k and a rectangular slot 33f are preferably defined in the lower end 33b of the blade guide 33. The slot 33f extends across the round aperture 33k. The lower end 37n of the rod 37 is fitted into the round aperture 33k and a clearance is defined between the rod 37 and the round aperture 33k. Further, a flange 37k of the rod 37 is fitted into the blade guide 33 and a clearance is defined between the flange 37k and the blade guide 33. Therefore, the blade guide 33 can rotate or pivot about the rod 37 while still contacting the rod 37.

Referring to FIG. 3, a groove 33a is defined within the inner surface of the upper portion of the blade guide 33. A snap ring 35 is fitted into the groove 33a, thereby securely retaining the blade guide 33. The upper face 33m of the bottom of the blade guide 33 contacts the lower end 37m of the rod 37. Therefore, the blade guide 33 is mounted on the rod 37 such that axial movement of the blade guide 33 is restricted (i.e., the blade guide 33 preferably does not move along the axial or longitudinal axis of the rod 37).

The underside of the snap ring 35 contacts the upper surface of the flange 37k. A dust-resistant cover 39 is fitted onto the upper side of the snap ring 35 in order to seal the gap between the rod 37 and the blade guide 33. The dust cover 39 may be made of an elastic material, such as rubber or synthetic resin, thereby permitting the dust cover 39 to be compressed between the rod 37 and the blade guide 33.

Referring to FIG. 4, a tab (or projection) 33g extends outwardly from the outer peripheral surface of the blade guide 33. A key-shaped (or hook-shaped) extension (or flange) 33h projects from the distal end of the tab 33g. As noted above, the cam surface 33c is defined on the inner surface of the blade guide 33 and the cam surface 33c is disposed so as to be in sliding contact with the head 42b of the pushpin 42. Thus, the cam surface 33c influences the position of the pushpin 42 in accordance with the angle of rotation of the blade guide 33. That is, as the blade guide 33 rotates about the rod 37, the cam surface 33c will push or urge the pushpin 42 into slot 37a in one rotating direction and the cam surface 33c will allow the pushpin 42 to withdraw from slot 37a in the other rotating direction. A first stopper 33e is formed at a first end of the cam surface 33c and a second stopper 33d is formed at a second end of the cam surface 33c. Each stopper 33d, 33e projects towards the axis of the cam surface 33c and defines the angle of rotation of the blade guide 33 with respect to the rod 37. Thus, the first stopper 33e preferably defines the blade replacement position and the second stopper 33d preferably defines the initial position, as will be further discussed below.

As shown in FIG. 3, a torsion spring 44 may be disposed around the rod 37. As shown in FIG. 4, a first end 44a of the torsion spring 44 is inserted into a slot 33j defined within the tab 33g of the blade guide 33. As shown in FIG. 3, a second end 44b of the torsion spring 44 is inserted (biased) into a slot 37d defined within the rod 37. Accordingly, the torsion spring 44 biases the blade guide 33 about the rod 37 in the direction of arrow R, as shown in FIG. 4. When the second stopper 33d contacts the contact portion 42a, the blade guide 33 is restricted to the position shown in FIG. 4. Hereinafter, this position will referred to as "the initial position" of the blade guide 33. In this state, the pushpin 42 projects into the slot 37a.

Referring back to FIG. 1, the collar 52 is pivotably mounted to a lower, front portion of the housing 12. The collar 52 may be manually rotated or pivoted to move the blade clamp 26 from the initial position (i.e., a position in which the pushpin 42 contacts the second stopper 33d) or the blade locked position (i.e., a position in which blade replacement is prohibited) to the blade replacement position (i.e., a position in which blade replacement is permitted). The collar 52 optionally may be made of a translucent or a transparent material.

Figure 11:
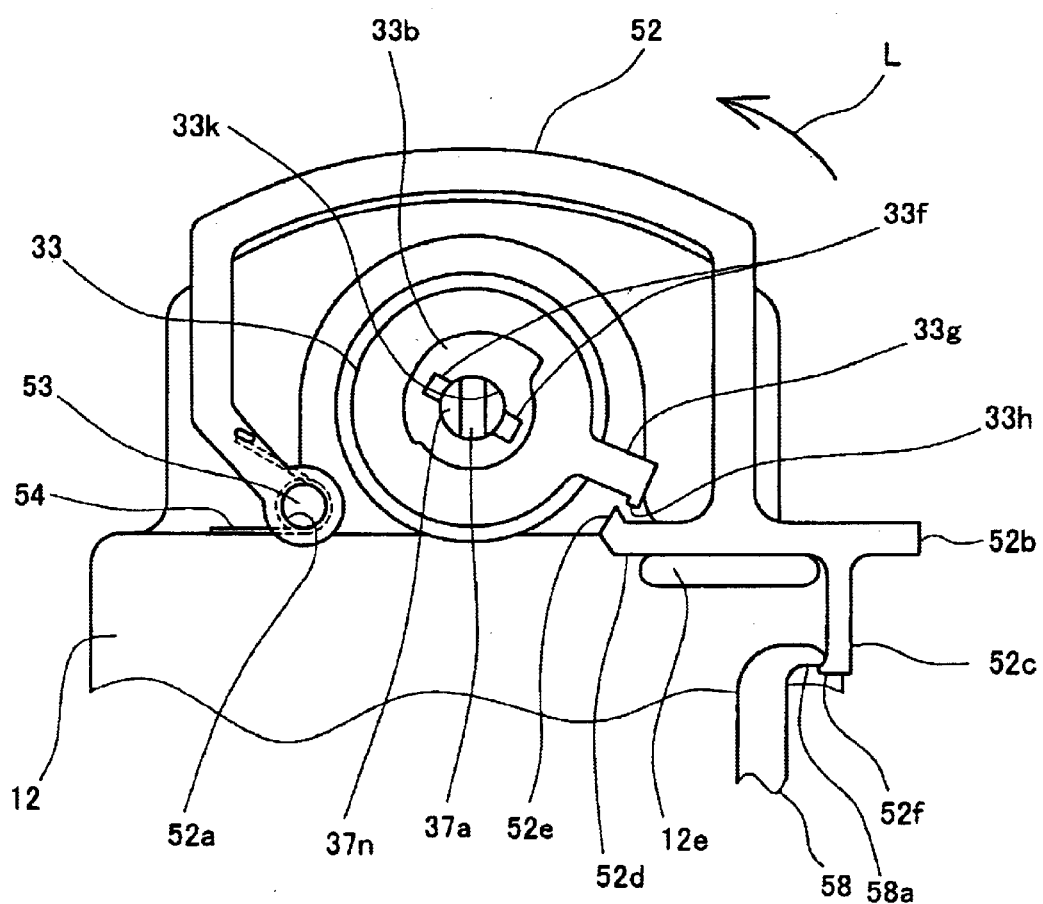
FIG. 11 is a cross-sectional view taken along arrow A of FIG. 1, in which the collar is disposed in a closed position.
Figure 15:
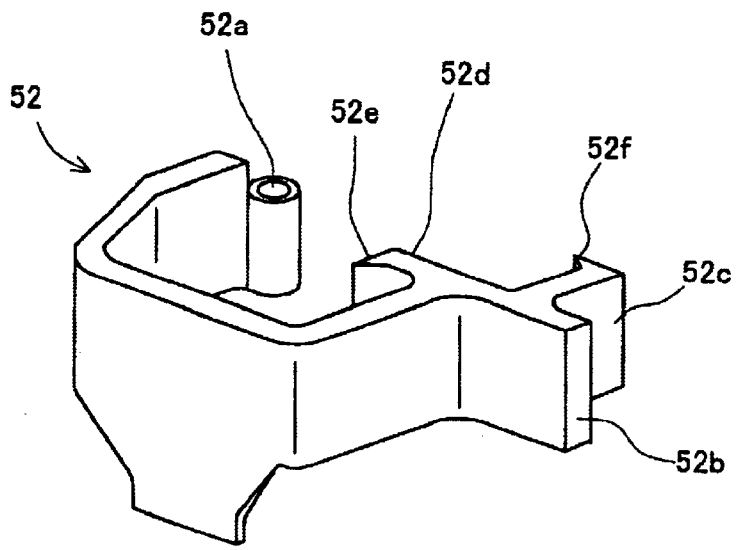
FIG. 15 is a perspective view of a representative collar.

Referring to FIGS. 11 and 15, the collar 52 may have a substantially U-shaped cross-section, although the shape of the collar 52 is not particularly restricted according to the present teachings. Various designs may be utilized for the collar 52 as long as the essential functions of the collar 52 are performed. A shaft hole 52a may be defined within one end of the collar 52. A shaft 53 may be affixed to the housing 12 and inserted through the shaft hole 52a. Thus, the collar 52 is pivotally attached to the housing 12 and can rotate or turn about the shaft 53. Further, a torsion spring 54 may be disposed between the collar 52 and the housing 12. Preferably, the torsion spring 54 biases the collar 52 in a direction opposite to the arrow L shown in FIG. 11. Hereinafter, the direction of arrow L will be referred to as an "opening direction" and the direction opposite of arrow L will be referred to as a "closing direction."

A tab 52b, a lock portion 52c, and a hook portion 52d are preferably defined at the opposite end of the collar 52 from the shaft hole 52a. The tab 52b extends or projects outwardly in order to permit an operator to pivot or rotate the collar 52 about the shaft 53. The hook portion 52d extends in an opposite direction (inward direction) with respect to the tab 52b. A key-like portion 52e is formed at the terminal end of the hook portion 52d. When the collar 52 is pivoted or rotated in the opening direction, the key portion 33h of tab 33g will catch or engage the key portion 52e. Accordingly, the blade guide 33 will turn or rotate together with the collar 52. The lock portion 52c projects from the tab 52b toward the housing 12. Another key portion 52f is formed at the terminal end of the lock portion 52c. The housing 12 further includes a stopper 12e and a lock member 58. Another key portion 58a is formed at the terminal end of the lock member 58.

When the operator releases the collar 52, the torsion spring 54 will bias the collar 52 in the closing direction. In that case, the collar 52 will contact the stopper 12e of the housing 12 and the key portion 52f of the collar 52 will engage the key portion 58a of the lock member 58. Therefore, lock member 58 will lock the collar 52 in position with respect to the housing 12 and the collar 52 can be reliably secured to the housing 12 during a sawing operation. In order to unlock the collar 52, a force that is greater than the biasing force of the torsion spring 54 must be applied to the collar 52 so as to disengage the keys 52f, 58a. Hereinafter, the position where the collar 52 contacts the stopper 12e will be referred to as the closed position of the collar 52.

A representative method for operating the blade clamp 26 will now be discussed. Before the blade 22 is inserted into and attached to the blade clamp 26, the collar 52 may be locked in the closed position by the lock member 58, as is shown in FIG. 11. Also, in the initial position as shown in FIG. 4, the second stopper 33d of the blade guide 33 contacts the contact portion 42a of the pushpin 42. Thus, a clearance exists between the tab 33g of the blade guide 33 and the hook portion 52d of the collar 52, as shown in FIG. 11.

In order to affix the blade 22 to the drive shaft 24 via the blade clamp 26, the collar 52 is rotated or pivoted in the opening direction L. For example, the operator may manually rotate or pivot the collar 52 about the shaft 53. By applying a force to the tab 52b, the lock portion 52c of the collar 52 will disengage from the lock member 58 of the housing 12 so as to permit the collar 52 to rotate or pivot in the opening direction L. Therefore, the hook portion 52d of the collar 52 will contact the tab 33g of the blade guide 33. By further applying a rotating force (torque) to the collar 52, the hook portion 52d will continue to contact the tab 33g.

Consequently, the blade guide 33 will rotate as the key portion 52e of the hook portion 52d catches or engages the key portion 33h of the tab 33g. Therefore, the hook portion 52d is prevented from separating from the tab 33g while the blade guide 33 is rotating or pivoting.

Figure 5:
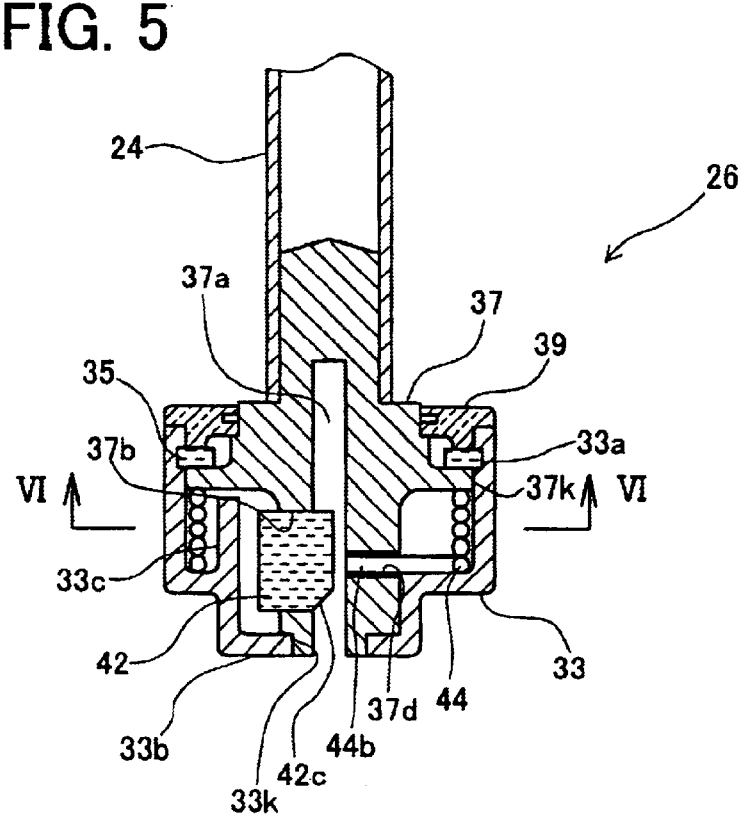
FIG. 5 is a cross-sectional view showing the blade clamp when the blade guide (sleeve) has been rotated or pivoted to the blade replacement position.
Figure 6:
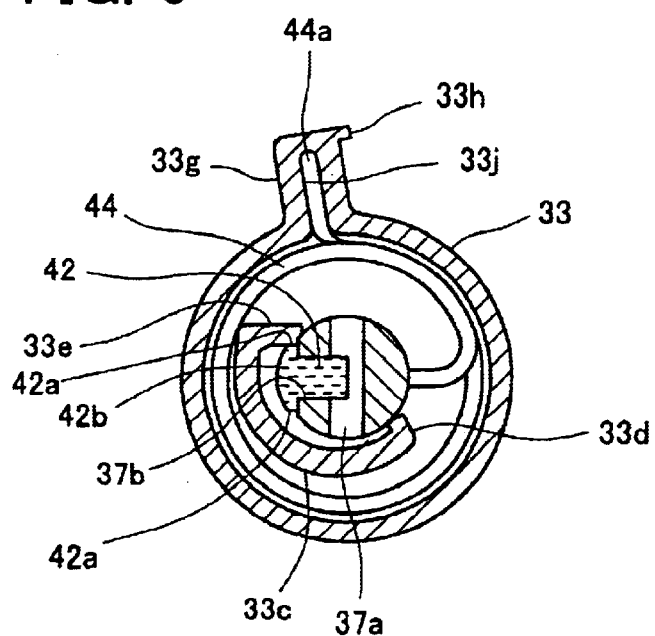
FIG. 6 is a cross-sectional view taken along line VI—VI of FIG. 5.
Figure 12:
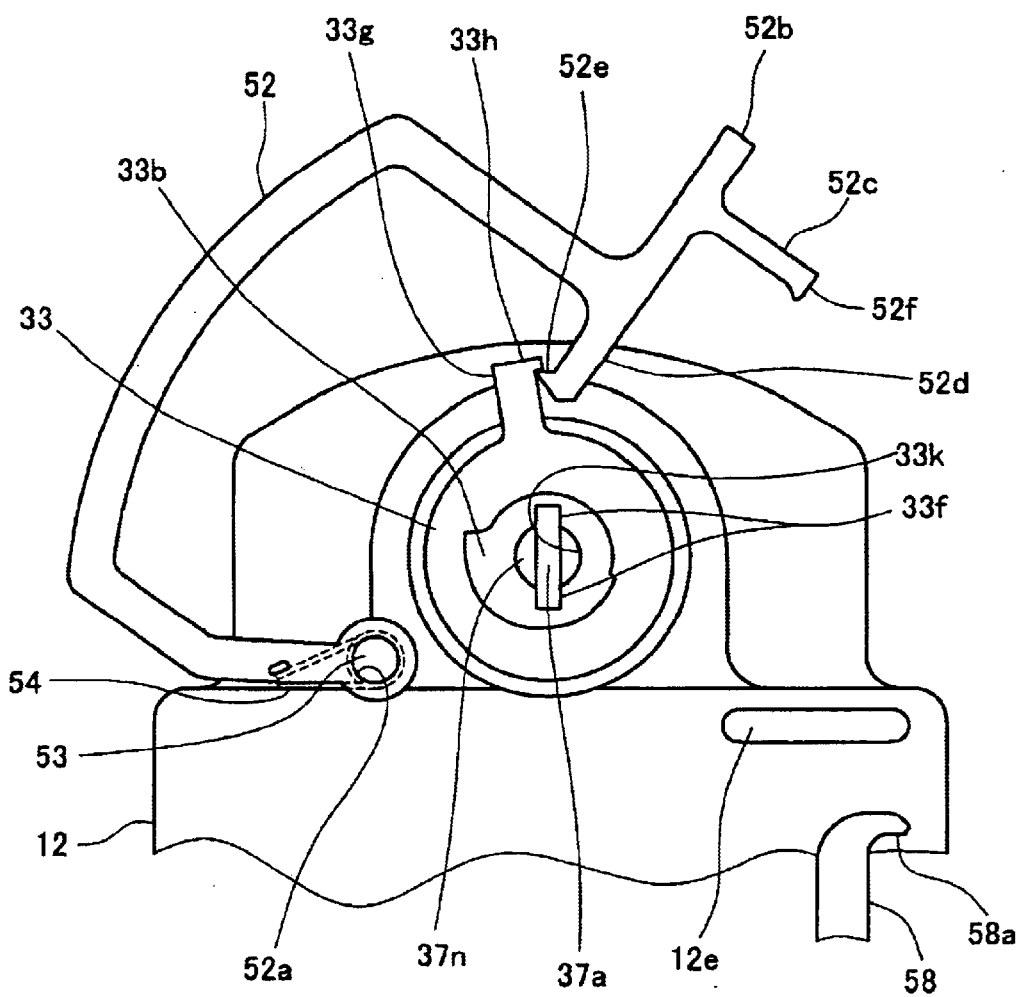
FIG. 12 is a cross-sectional view taken along arrow A of FIG. 1, in which the collar is disposed in an open position.

When the blade guide 33 pivots to a predetermined angle, the first stopper 33e of the cam surface 33c will contact the contact portion 42a of the pushpin 42 and consequently, the blade guide 33 is prevented from further pivoting, as shown in FIGS. 5 and 6. Moreover, when the first stopper 33e contacts the contact portion 42a, the slot 33f of the blade guide 33 aligns with the slot 37a of the rod 37, as shown in FIG. 12. That is, the slot 33f of the blade guide 33 extends beyond both ends of the slot 37a of the rod 37, thereby providing a longer slot. The width of the slot defined by the rod 37 and blade guide 33 is slightly longer than the width W of the blade 22. As shown in FIG. 17, width W is defined as the distance from the side edge of one projection 22b to the side edge of the other projection 22b. As a result, the blade 22 can be easily inserted into the blade slot defined by the blade guide 33 and rod 37.

When the blade guide 33 is disposed in this blade replacement position, the blade 22 can be inserted into or removed from the blade clamp 26. If a blade is inserted in the blade guide 33 when the blade guide is rotated or pivoted to the blade replacement position, the leaf spring 62 will automatically bias or push the blade 22 out of the blade guide 33 without requiring operator assistance. Therefore, the operator is not required to touch the blade 22 in order to remove the blade 22, which is particularly advantageous if the jigsaw 10 has been recently operated and the blade 22 is hot.

When the blade guide 33 is pivoted or rotated to the blade replacement position from the initial position (or the blade locked position), the cam surface 33c formed in the blade guide 33 pivots or rotates at the same time. Therefore, the cam surface 33c will separate from the head 42b of the pushpin 42, as indicated in FIGS. 5 and 6.

When the blade guide 33 is disposed in the blade replacement position and the blade 22 is inserted into the slot 37a, the base end upper face 22d of the blade 22 will contact the inclined plane 42c of the pushpin 42. The pushpin 42 will therefore move toward the cam surface 33c. When the blade 22 is further inserted into the slot 37a, the upper face 22d of the blade 22 will lift and deform the leaf spring 62 in order to contact the inner surface of the slot 37a, as is shown in FIG. 16. Therefore, opposing forces act on the blade 22.

After the blade 22 has been inserted into the blade clamp 26, the force (torque) applied to the collar 52 is reduced or withdrawn (i.e., the collar 52 is manually released). In that case, the blade guide 33 will automatically return to the blade locked position due to the biasing force of the torsion spring 44. Therefore, the slot 33f of the blade guide 33 will no longer align with the slot 37a of the rod 37. Accordingly, as shown in FIG. 2, the projections 22b of the blade 22 will contact the upper surface of the lower end 33b of the blade guide 33, thereby preventing the blade 22 from being removed from the blade clamp 26.

As noted above, the cam surface 33c rotates together with the blade guide 33. As a result, when the blade guide 33 rotates or pivots towards the blade locked position, the cam surface 33c will push or urge the pushpin 42 toward the side surface of the blade 22. Therefore, the blade 22 will be securely retained between the pushpin 42 and a wall 37j defining a portion of the slot 37a, as shown in FIGS. 7 to 10. Because the blade 22 is firmly fixed or secured in position in such a manner, no clearance or space exists between the blade 22 and the rod 37.

Figure 7:
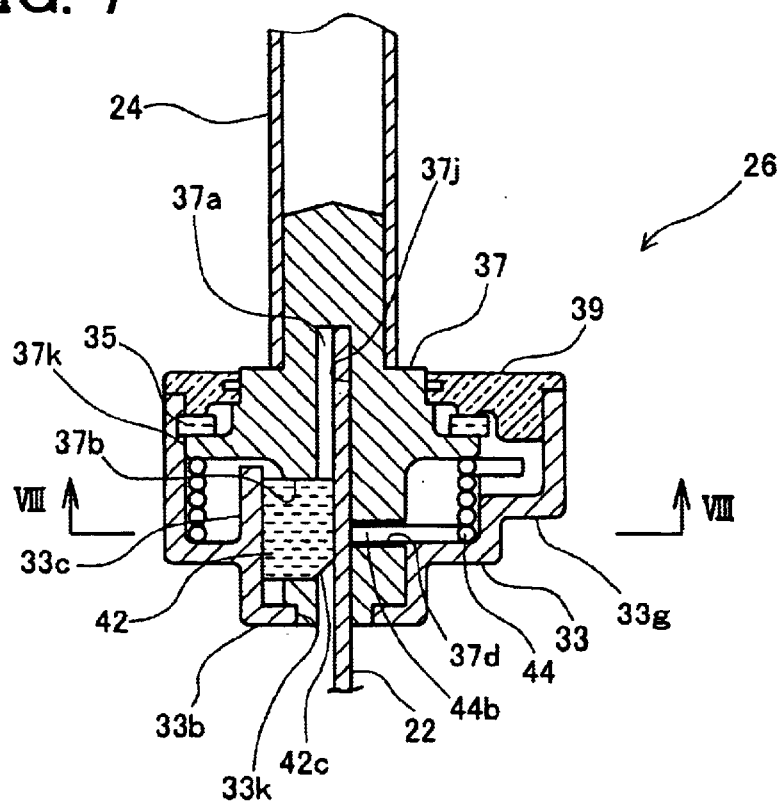
FIG. 7 is a cross-sectional view showing the blade clamp when a relatively thin blade is disposed within the blade clamp.
Figure 8:
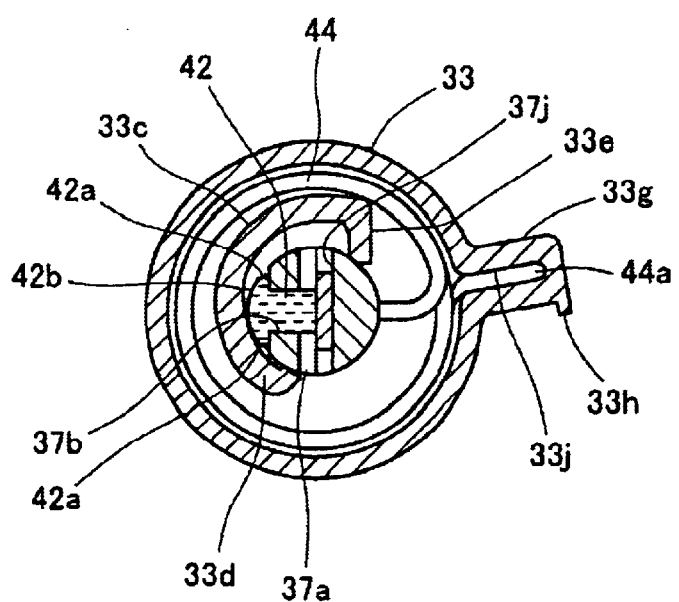
FIG. 8 is a cross-sectional view taken along line VIII—VIII of FIG. 7.
Figure 9:
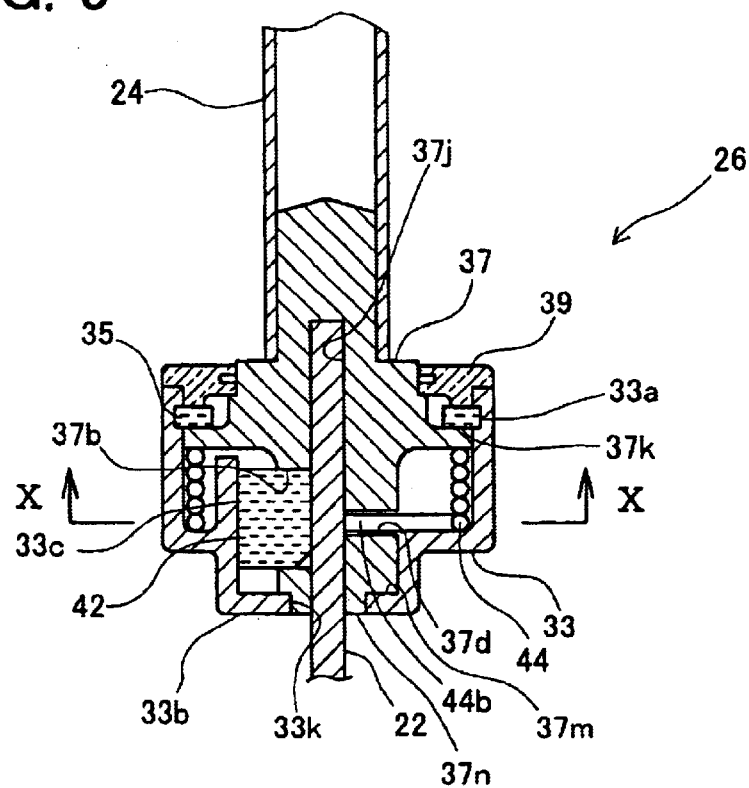
FIG. 9 is a cross-sectional view showing the blade clamp when a relatively thick blade is disposed within the blade clamp.
Figure 10:
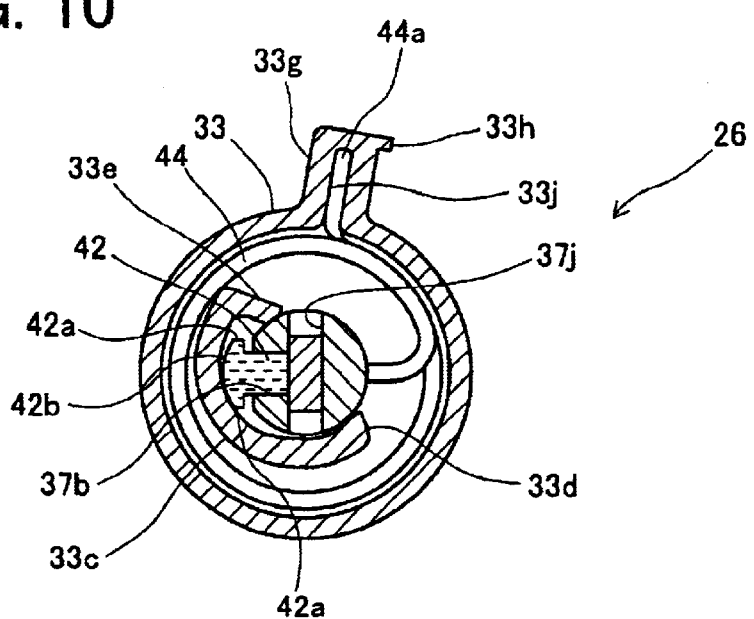
FIG. 10 is a cross-sectional view taken along line X—X of FIG. 9.

As mentioned above, the blade 22 is secured to the blade clamp 26 by being tightly held between the pushpin 42 and the wall 37*j*. Therefore, even if the thickness of the blade 22 varies, the blade 22 can be reliably secured to the rod 37. FIGS. 7 and 8 show a relatively thin blade 22 (e.g., a blade thickness of 0.9 mm) that is firmly fixed in position. FIGS. 9 and 10 show a relatively thick blade 22 (e.g., a blade thickness of 1.8 mm) that is firmly fixed in position. Thus, as noted above, the present blade clamps can be advantageously utilized with blades of varying thickness.

Figure 13:
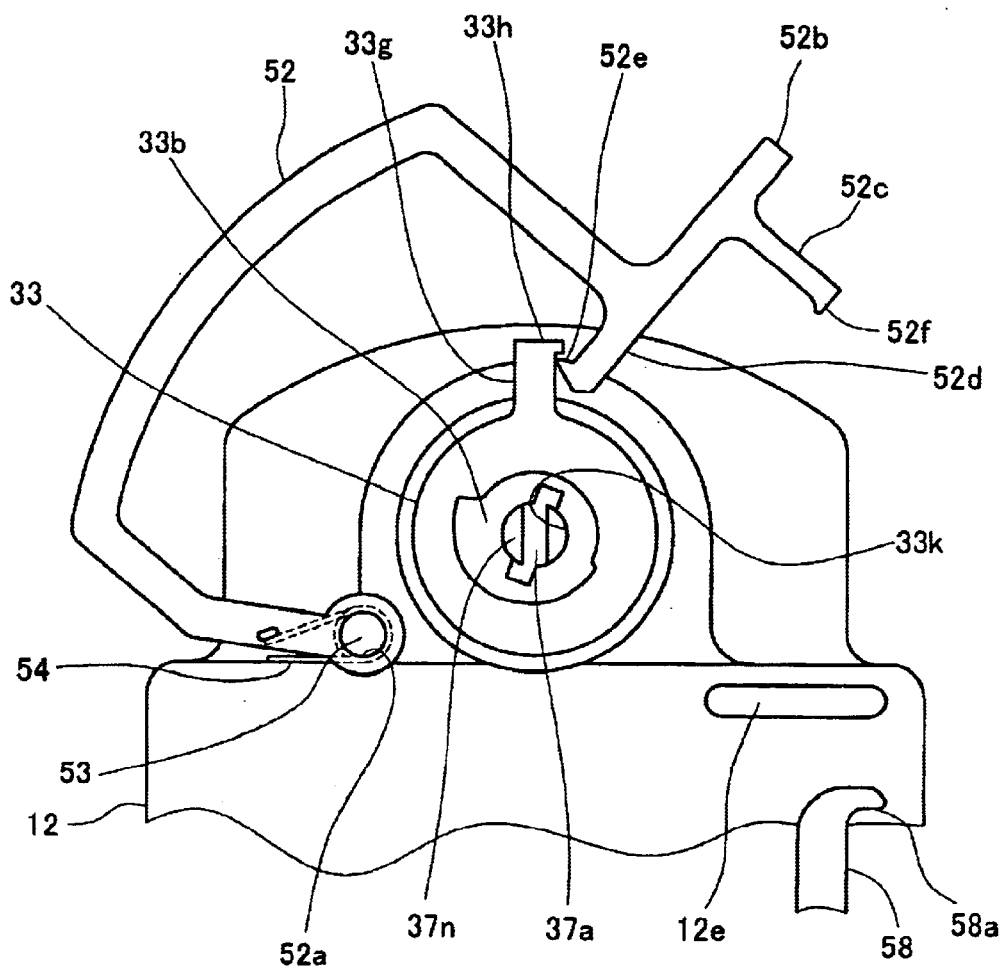
FIG. 13 is a cross-sectional view taken along arrow A of FIG. 1, in which the collar is disposed in the blade locked position and a relatively thick blade is disposed in the blade clamp.
Figure 14:
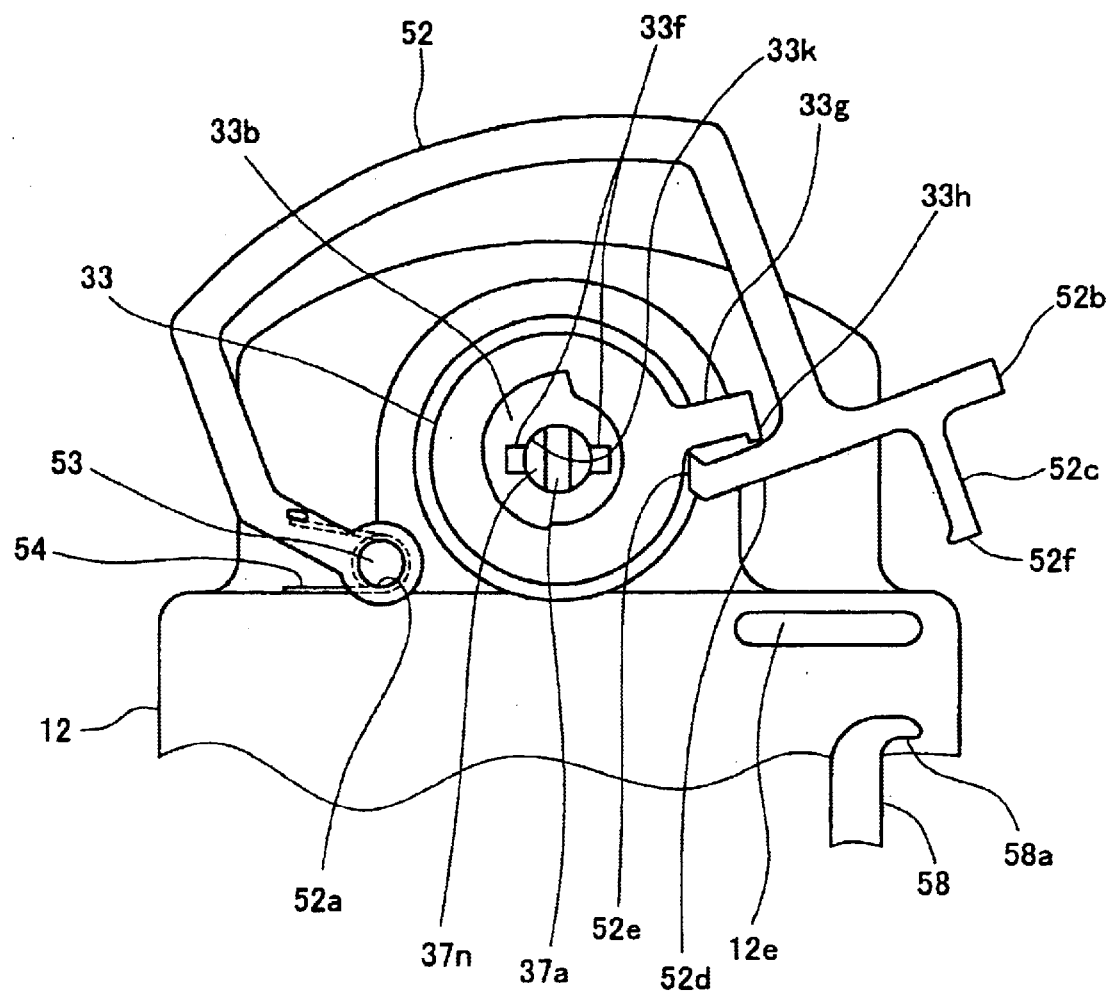
FIG. 14 is a cross-sectional view taken along arrow A of FIG. 1, in which the collar is disposed in the blade locked position and a relatively thin blade is disposed in the blade clamp.

When the blade 22 is firmly fixed in the blade locking position, the head 42*b* of the pushpin 42 projects beyond the periphery of the rod 37, as compared to the state in which the blade guide 33 is in the initial position. Therefore, the blade guide 33 is restricted or prevented from pivoting past the blade locking position (i.e., toward the initial position) when the head 42*b* of the pushpin 42 contacts the cam surface 33*c* of the blade guide 33. Accordingly, the blade guide 33 will rotate or pivot toward the initial position (and the blade locked position) together with the collar 52 and the blade guide 33 will stop in either of the representative blade locking positions shown in FIGS. 13 and 14. FIG. 13 shows a relatively thick blade that is affixed to the drive shaft 24 by the blade clamp 26 and FIG. 14 shows a relatively thin blade that is affixed to the drive shaft 24 by the blade clamp 26. Thus, the blade locked position of the blade guide 33 will be determined by the thickness of the blade 22 that has been inserted into slot 37*a*.

However, because the torsion spring 54 biases the collar 52, the collar 52 will return to the closed position (shown in FIG. 11) from the positions shown in FIGS. 13 and 14. That is, the collar 52 will separate or disengage from the blade guide 33 so that the collar 52 can return to the closed position, regardless of the rotational position of the blade guide 33. Therefore, the blade clamp 26 can freely reciprocate during a sawing operation without contacting the collar 52. Further, the collar 52 will protect the blade clamp 26 during a sawing operation and the collar 52 will also protect the operator's hands from injury due to the reciprocating blade clamp 26.

In order to remove the blade 22 from the blade clamp 26, the collar 52 can be rotated or pivoted in the opening direction (arrow L shown in FIG. 11), so as to cause the blade guide 33 to rotate or pivot towards the blade replacement position. By rotating the blade guide 33 towards the blade replacement position, the cam surface 33*c* stops actively pressing or urging the pushpin 42 against the side surface of the blade 22. Therefore, the blade 22 will be unlocked and is free to be removed. When the blade guide 33 is disposed in the blade replacement position, the slot 33*f* of the blade guide 33 aligns with the slot 37*a* of the rod 37 and the projections 22*b* of the blade 22 can pass through the aligned slots 33*f*, 37*a*. Thus, the blade 22 can be easily removed from the blade clamp 26. In addition, as noted above, the biasing force of the leaf spring 62 acts on the blade 22 and the blade 22 will be automatically pushed out of or ejected from the blade clamp 26 when the blade guide 33 is rotated to the blade replacement position.

Therefore, in the blade clamp 26 according to the first representative embodiment, the first stopper 33*e* of the cam surface 33*c* of the blade guide 33 will contact the contact portion 42*a* of the pushpin 42 and restrict the blade guide 33 from further pivoting or rotating past the blade replacement position (i.e., the position in which the slots 33*f*, 37*a* are aligned). Consequently, the blade guide 33 can be reliably positioned in the blade replacement position. Therefore, by improving the precision of the blade guide 33, the rod 37 and the pushpin 42, the blade guide 33 can be more accurately positioned in the blade replacement position. However, because the collar 52 is not utilized for positioning the blade guide 33 in the blade replacement position, no special measures are required to be taken with respect to the collar 52 or the housing 12, which is a significant advantage over the prior art blade clamp that was described above.

Further, when the collar 52 is disposed in its closed position and the blade guide 33 is disposed in its initial position or the blade locked position, the collar 52 does not contact the blade guide 33. Thus, even if the trigger switch 14 is mistakenly or accidentally turned ON (actuated) without the blade 22 being attached to the blade clamp 26, the collar 52 and the blade clamp 26 will not be damaged due to the reciprocating movement of the drive shaft 24.

In addition, when the blade guide 33 is pivoted or rotated to the blade replacement position with the blade 22 secured within the blade clamp 26, the leaf spring 62 automatically pushes or ejects the blade 22 from the blade clamp 26. Therefore, the blade detachment or removal operation can be accomplished without directly touching the blade 22 or the blade clamp 26, which may be hot due to heat generated during a sawing operation. Thus, the operator can safely remove the blade 22 without injury.

Furthermore, when the collar 52 is disposed in the closed position, the blade clamp 26 is enclosed or surrounded (and thereby protected) by the collar 52. Therefore, the operator is prevented from accidentally touching the blade clamp 26, which will reciprocally move during a sawing operation. Further, the collar 52 prevents saw dust or other materials from the workpiece from being scattered. Moreover, if the collar 52 is made of a translucent or transparent material, the operator can see the blade 22 while the workpiece is being cut.

In the above-described embodiment, the first and second stoppers 33*e*, 33*d* and the pushpin 42 restrict or limit the pivotal range of the blade guide 33 relative to the rod 37, because the first stopper 33*e* is formed at one end of the cam surface 33*c* and the second stopper 33*d* is formed at the other end of the cam surface 33*c*. However, the present teachings are not limited to such an arrangement and may be modified in various ways. For example, the blade guide 33 may include stoppers and the rod 37 may include a contact portion that is designed to contact the stoppers. When a stopper of the blade guide 33 contacts a contact portion of the rod 37, the blade guide 33 will be restricted from pivoting relative to the rod 37.

Second Detailed Representative Embodiment

Figure 18:
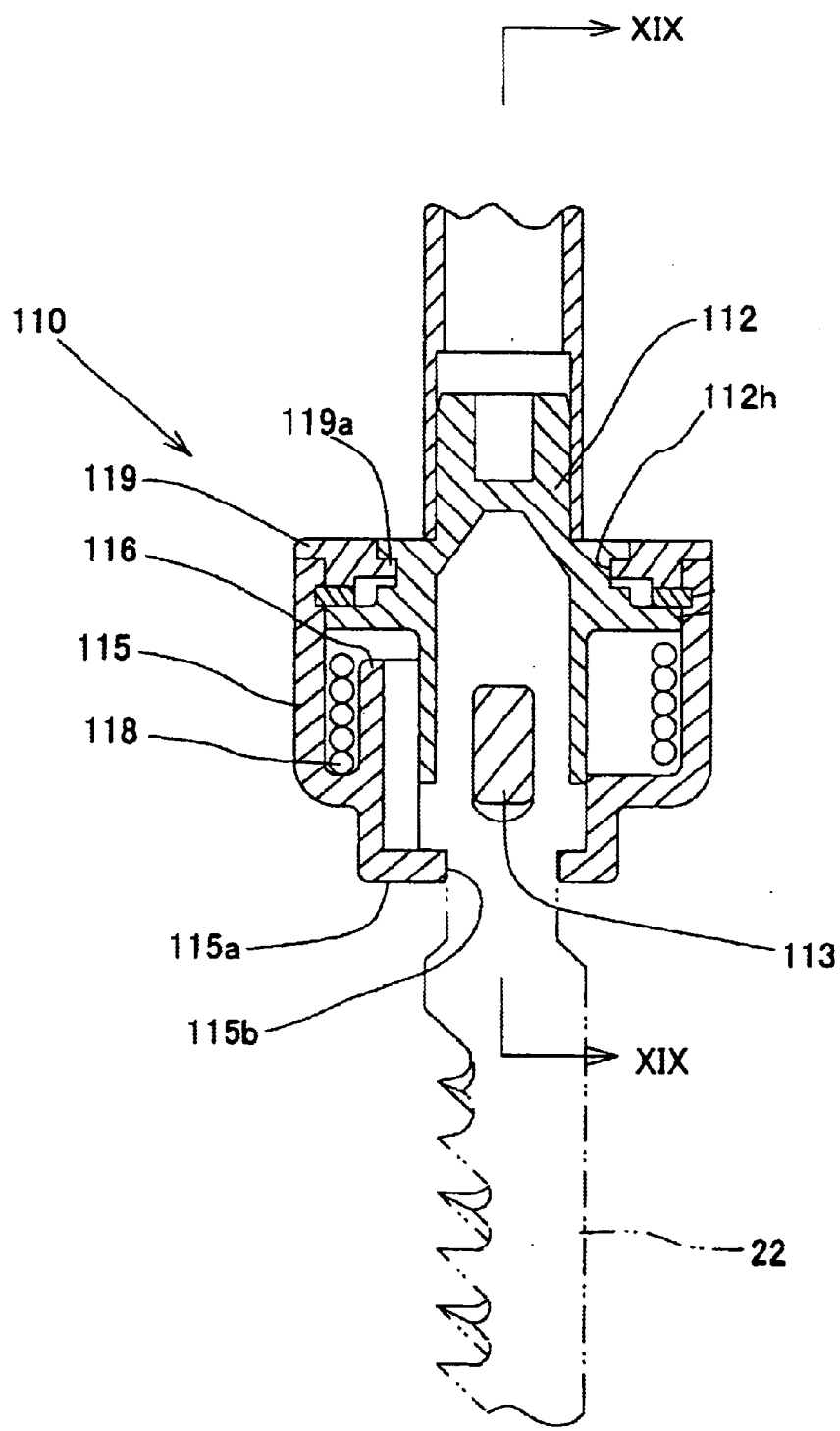
FIG. 18 is a longitudinal cross-sectional view showing a blade clamp according to the second representative embodiment.

Similar to the blade clamp 26 of the first representative embodiment, the blade clamp 110 of the second representative embodiment may include a rod 112, a pushpin 113 and a blade guide 115, as shown in FIG. 18. The rod 112 and pushpin 113 employed in the second representative embodiment may have substantially the same structure as the rod 37 and pushpin 42 employed in the first representative embodiment. Therefore, only the portions of the blade guide 115 that differ from the blade guide 33 of the first representative embodiment will now be described.

Figure 21:
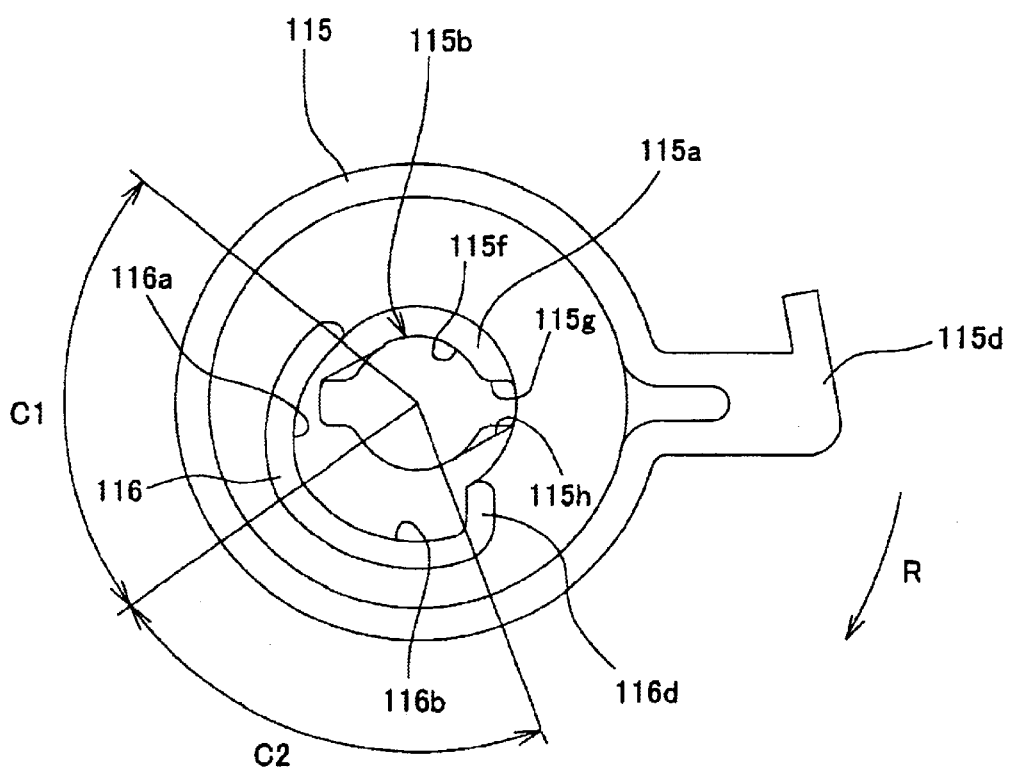
FIG. 21 is a plan view showing a blade guide (sleeve) according to the second representative embodiment.

As shown in FIG. 21, an aperture 115*b* is preferably defined in the bottom 115*a* of the blade guide 115 by a combination of a round opening 115*f* and a pair of rectangular-shaped slots 115*g*. Specifically, the aperture 115*b* may include four corners where arc-shaped portions of the round opening 115*f* respectively adjoin the adjacent slots 115*g*, which slots 115*g* radially extend from the round opening 115*f*. Two diagonally opposing corners, as indicated by lines in FIG. 21, may be chamfered in order to define inclined planes 115h. That is, each radial slot 115g may have one tapered side.

Figure 19:
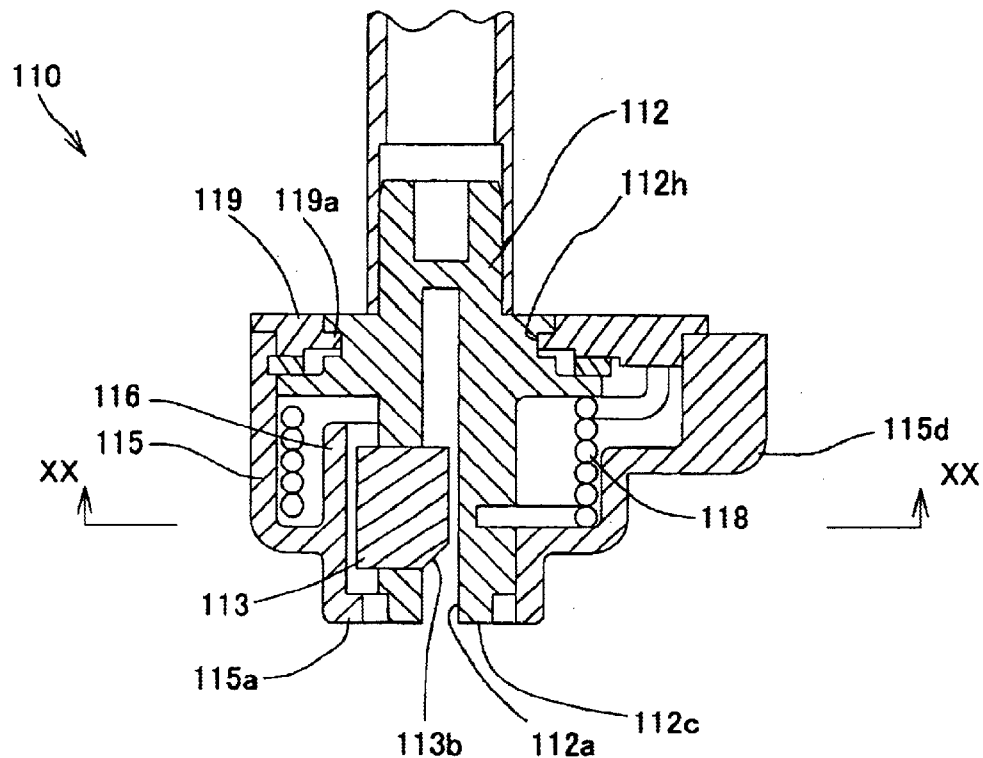
FIG. 19 is a cross-sectional view taken along line XIX—XIX of FIG. 18.

The round opening 115f has a diameter that corresponds to the diameter of the lower end 112c of the rod 112, which lower end 112c is shown in FIG. 19. The diameter of the round opening 115f is slightly greater than the width of the indentations or recesses 22c of the blade 22, which recesses 22c are shown in FIG. 17. The distance between the distal end of a first slot 115g and the distal end of a second slot 115g (i.e., the length of aperture 115b in the radial direction) is slightly greater than the widest portion of the blade 22. Naturally, the distance between the side edge of the one projection 22b and the side edge of the other projection 22b is the widest portion of the blade 22, as shown in FIG. 17. Therefore, the inclined planes 115h guide the blade 22 into an appropriate position within the slot 112a of the rod 112, even if the blade 22 is obliquely inserted into the slot 112a. This feature of the second representative embodiment will be further described below.

FIG. 21 shows the shape of a cam surface 116 of the blade guide 115. The cam surface 116 includes a first cam face 116a, which covers the range indicated by reference mark C1, and a second cam face 116b, which covers the range indicated by reference mark C2. The first cam face 116a and the second cam face 116b form a continuous cam face or surface. Thus, the first cam face 116a will push the pushpin 113 according to the distance between the central or rotational axis of the blade guide 115 and the first cam face 116a. This distance naturally will vary as the blade guide 115 pivots or rotates. On the other hand, the second cam face 116b will not actively push or urge the pushpin 113, because the distance from the central or rotational axis of the blade guide 115 to the second cam face 116b is constant. A stopper 116d may be formed at the end of the second cam face 116b and may project generally in the direction of the central or rotational axis of the blade guide 115.

Referring to FIGS. 18 and 19, a dust cover 119 may be fitted onto the upper end of the blade guide 115 and the dust cover 119 may be made of an elastic material, such as rubber or synthetic resin. In the second representative embodiment, an outer peripheral groove 112h having a rectangular cross-section is defined within the rod 112. Thus, the inner peripheral edge 119a of the dust cover 119 is pressed into the groove 112h and the dust cover 119 is prevented from being pulled out along the axial direction (i.e., vertically as shown in FIG. 19).

The surface of the blade guide 115 may be nickel-plated in order to increase surface hardness and smoothness and decrease frictional resistance, as compared to other rust-proofing treatments (e.g., chromate treatment and galvanization). Accordingly, smooth pivoting of the blade guide 115 is ensured during rotation. Also, as described in the first representative embodiment, the pushpin 113 may include a tapered edge 113b for pushing the pushpin 113 out of the rod aperture 112b when the blade 22 is inserted through slot 112a.

Figure 20:
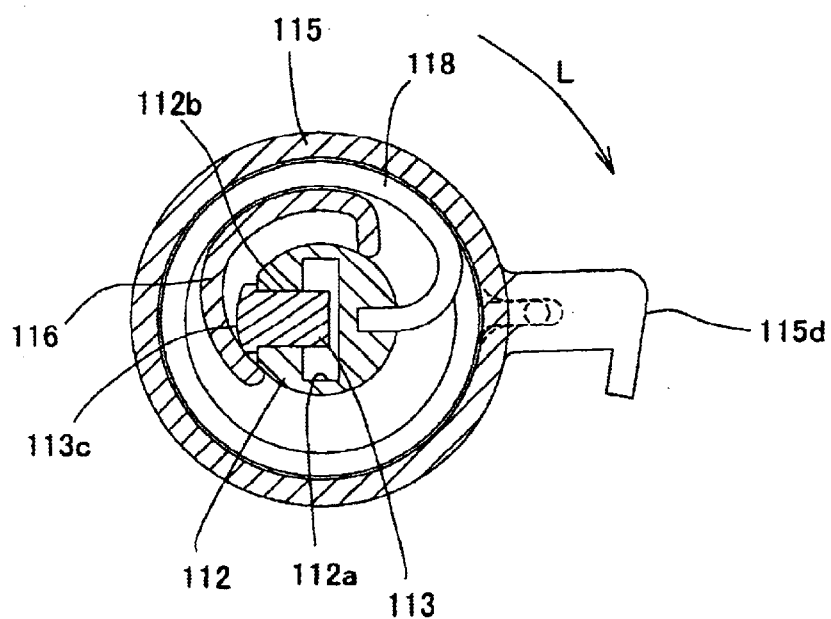
FIG. 20 is a cross-sectional view taken along line XX—XX of FIG. 19.
Figure 22:
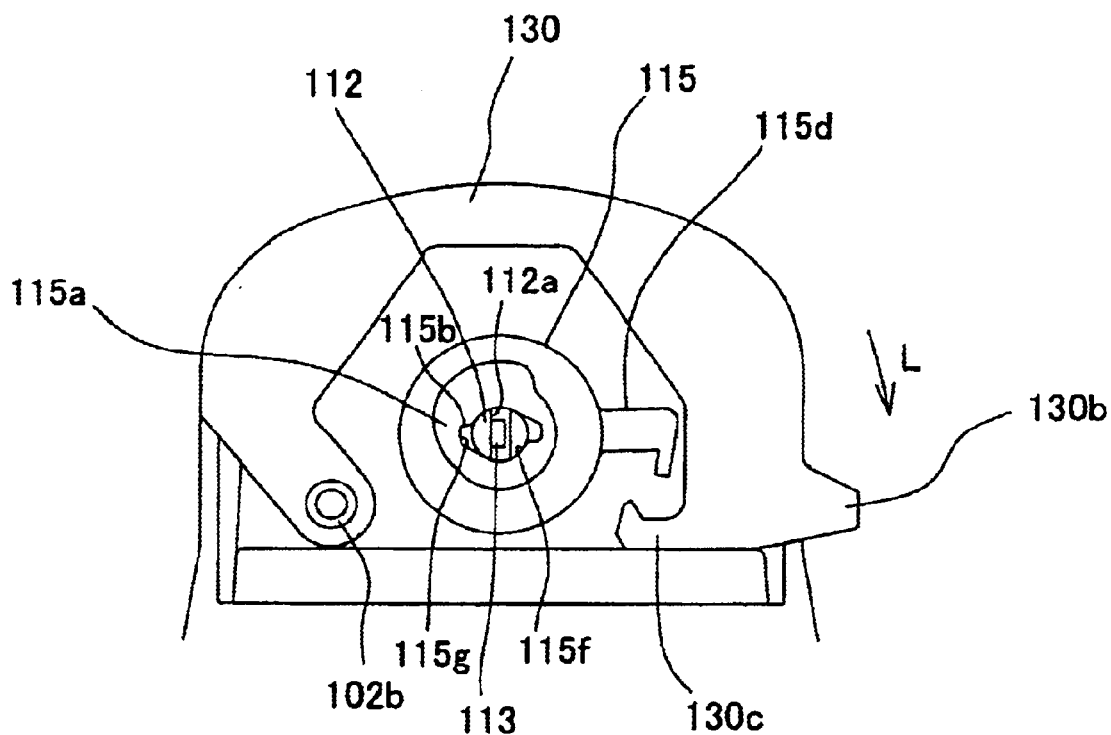
FIG. 22 is a bottom view showing the blade clamp of FIG. 21.

A representative method for operating the blade clamp 110 having the above structure will now be discussed. FIG. 22 shows a bottom view of the blade clamp 110 without the blade 22. In this state, the torsion spring 118 (shown in FIG. 19) biases the blade guide 115 in the direction of arrow L as shown in FIG. 20. The cam surface 116 of the blade guide 115 can not push the pushpin 113 further forward, thereby prohibiting the blade guide 115 from further pivoting in the direction of arrow L as shown in FIG. 20. Thus, in this representative embodiment, a second stopper is not required to define the initial position. Moreover, in this initial position, the blade 22 can not pass through the slot 112a, because the pushpin 113 is blocking the slot 112a, as shown in FIG. 22.

Figure 23A:
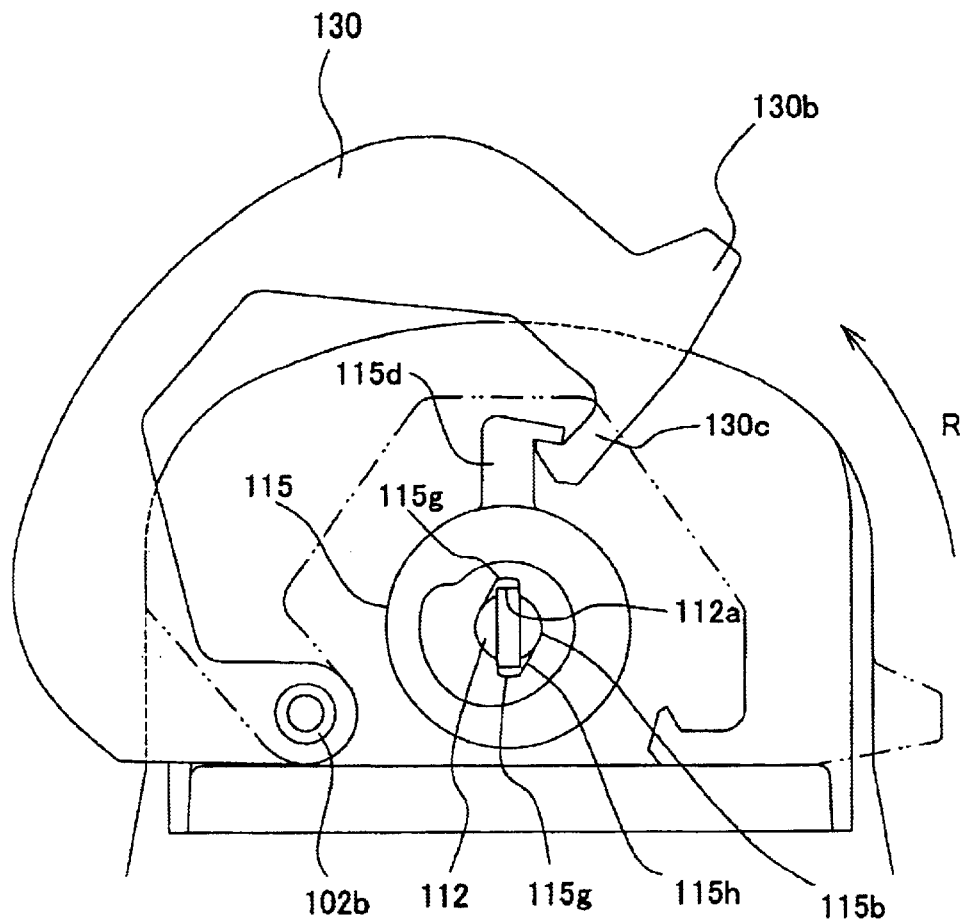
FIG. 23(*a*) is a bottom view showing the blade clamp of FIG. 22 when the collar is disposed in an open position and the blade guide (sleeve) is disposed in the blade replacement position.
Figure 23B:
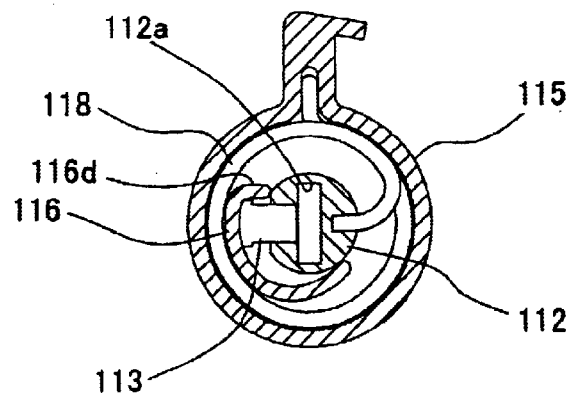

In order to attach the blade 22 to the blade clamp 110, a tab 130b of a collar 130 may be manually pushed or rotated in the opening direction (i.e., the direction opposite to arrow L in FIG. 20). As a result, the collar 130 will pivot or rotate about a shaft 102b until a projection 115d of the blade guide 115 catches or engages a hook 130c. As shown in FIG. 23(a), when more force (torque) is applied to the collar 130 in the opening direction, the blade guide 115 will rotate or pivot towards the blade replacement position together with the collar 130 against biasing force of the torsion spring 118. As shown in FIG. 23(b), in the blade replacement position, the pushpin 113 contacts the stopper 116d of the cam surface 116 so as to restrict further rotation of the blade guide 115.

In the blade replacement position, the slots 115g extending from the round opening 115b are in alignment with the slot 112a. When the blade 22 is inserted into the slot 112a, the projections 22b of the blade 22 pass through the bottom 115a of the blade guide 115 via the aperture 115b. Thus, the base end of the blade 22 is accommodated within the slot 112a. At this time, the inclined planes (or tapered planes) 115h, which are defined by the round opening 115b, facilitate insertion of the blade 22 into the slot 112a.

Figure 24A:
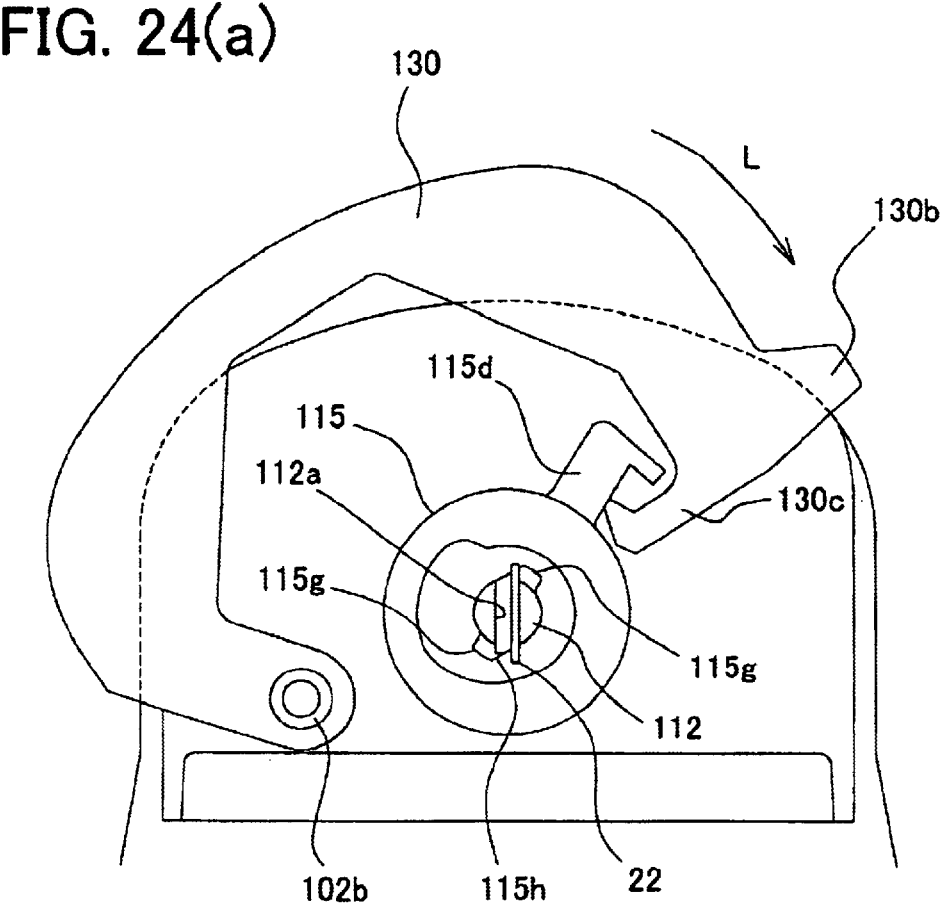
FIG. 24(*a*) is a bottom view showing the blade clamp of FIG. 22 when the collar and the blade guide (sleeve) are both disposed in a push start position.
Figure 24B:
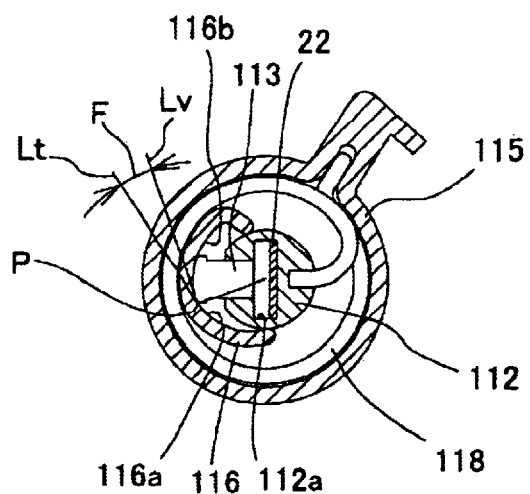

Then, the manual pressure or force being applied to the collar 130 is reduced or released while the base end of the blade 22 is kept sufficiently inserted in the slit 112a. As a result, the biasing force of the torsion spring 118 will turn or rotate the blade guide 115 and the collar 130 back to a "push start" position, as shown in FIGS. 24(a) and 24(b). As mentioned above, the radius of the second cam face 116b is constant with respect to the pushpin 113. Therefore, when the blade guide 115 rotates from the blade replacement position to the push start position, the second cam face 116b does not actively apply any force to the pushpin 113 in the direction perpendicular to the longitudinal axis of the blade 22.

In the push start position, the projections 22b are respectively moved away from the slots 115g and are supported (blocked) by the upper surface of the bottom 115a of the blade guide 115. Accordingly, the projections 22b are securely supported by the blade guide 115 and the blade 22 will not fall or drop out of the blade clamp 110. As noted above, between the blade replacement position and the push start position, the pushpin 113 does not actively apply any force to the blade 22. Furthermore, even if the blade 22 is obliquely inserted into the slot 112a, the blade 22 will be guided into the appropriate position within the slot 112a with the aid of the inclined planes 115h, which are defined by the round opening 115f. Therefore, the blade guide 115 can reliably rotate or pivot to a position that will hold the blade 22 within the blade clamp 110 without falling out. Consequently, the operator is not required to hold the blade 22 until the blade guide 115 reaches the blade locked position.

Subsequently, the blade guide 115 and the collar 130 are returned to the blade lock position (shown in FIGS. 25(a) and 25(b)) due to the biasing force of the torsion spring 118. During this portion of the rotation, the first cam face 116a will slidingly contact the pushpin 113 and push or urge the pushpin 113 in a direction perpendicular to the rotational axis. The pushpin 113 will press the blade 22 against one inner wall defining the slot 112a. Thus, the pushpin 113 can not be moved further forward than this inner wall and the pivotal position of the blade guide 115 in the closing direction is restricted. Thus, the blade guide 115 is locked in position and the blade 22 is securely retained within the slot 112a. This feature of the second representative embodiment enables the blade clamp 110 to securely clamp or lock blades of various thickness.

Figure 25A:
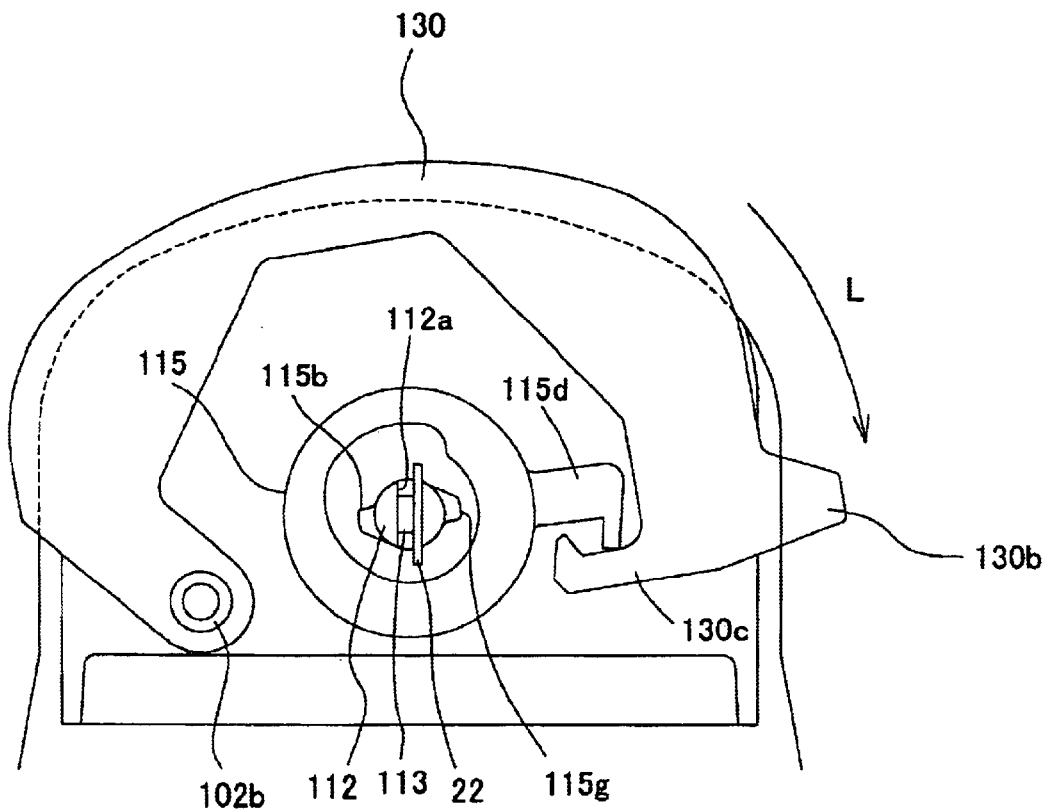
FIG. 25(*a*) is a bottom view showing the blade clamp of FIG. 22 when the collar and the blade guide (sleeve) are both disposed in the blade locked position.
Figure 25B:
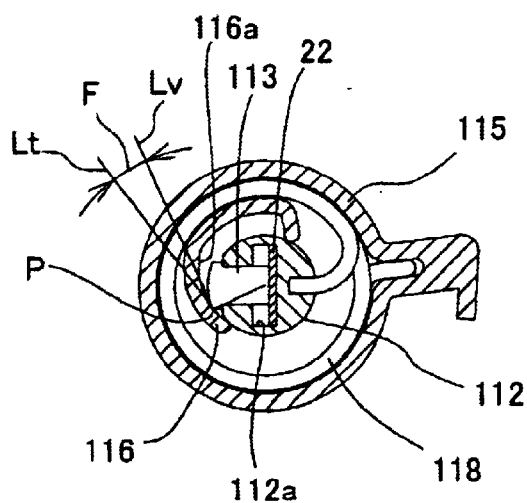

FIGS. 24(b) and 25(b) each show an angle F, or a friction angle, of the first cam face 116a. The friction angle F of the first cam face 116a is an angle defined between a common tangent Lt at the contact point P of the first cam face 116a and the head of the pushpin 113 and a straight line Lv that is perpendicular to a line passing through the contact point P and the rotational axis. The friction angle F preferably is between about 12–16°, thereby guaranteeing sufficient clamping force for the blade 22 within the pivotal range of the first cam face 116a (i.e., the range C1 shown in FIG. 21). Thus, after rotating past the push start position, the first cam face 116a applies more force against the pushpin 113 and thus the blade 22 in order to securely clamp the blade 22 within the blade clamp 110.

Figure 26A:
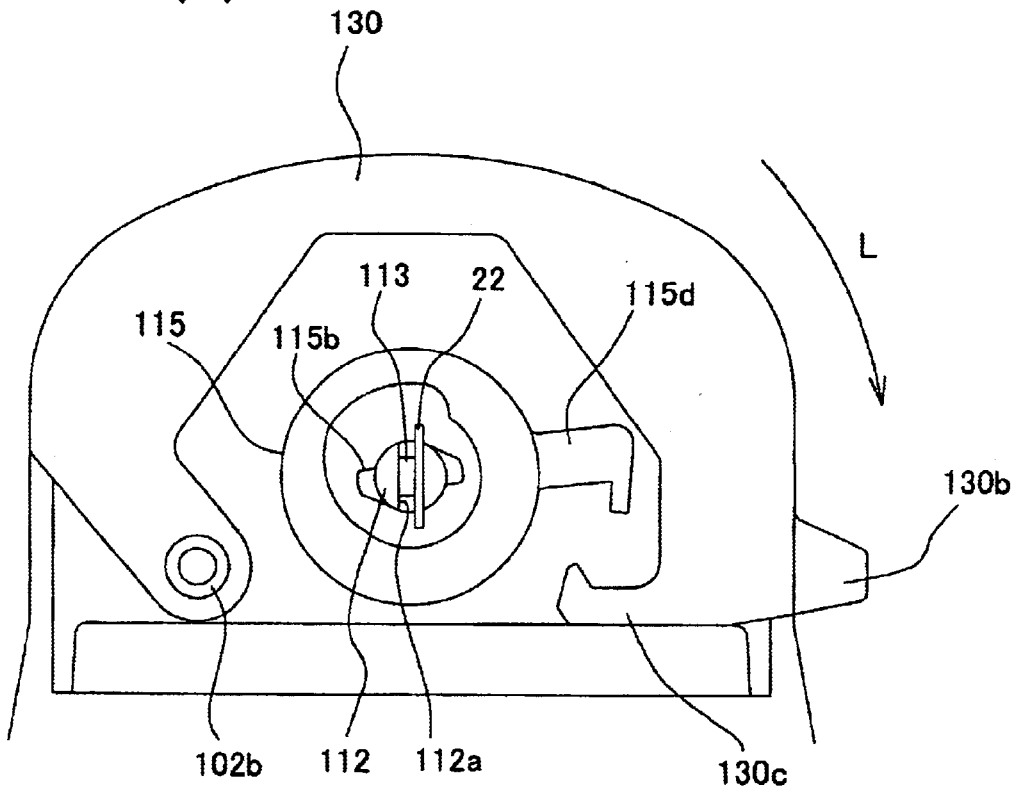
FIG. 26(*a*) is a bottom view showing the blade clamp of FIG. 22 when the collar is disposed in the closed position.
Figure 26B:
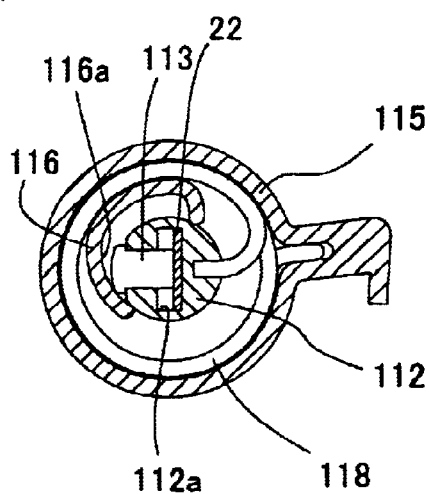

After the state shown in FIGS. 25(a) and 25(b), the pushpin 113 is not further displaced, thereby maintaining the blade guide 115 in the blade locked position. However, the collar 130 will disengage from the blade guide 115 and return to the closed position shown in FIGS. 26(a) and 26(b). Therefore, in the closed position, the collar 130 does not contact the blade guide 115 and the blade 22 is reliably attached to the drive shaft 24.

In the above embodiments, although relatively thin blades 22 were utilized, any blade that can be inserted into the slot 112a can be used, even if the thickness of the blade 22 leaves almost no space within the slot 112a.

Moreover, as should be clear from the above description, the blade guide 115 of the jigsaw according to the second representative embodiment can easily pivot from the blade replacement position to the push start position, regardless of the thickness of the blade 22. Accordingly, the projections 22b of the blade 22 will be securely locked within the blade guide 115.

What is claimed is:

1. An apparatus for affixing a blade having a pair of side projections to a drive shaft of a tool, comprising:

a rod arranged and constructed for attachment to a lower end of the drive shaft, the rod having a blade slot arranged and constructed to receive a base end of the blade so that a longitudinal axis of the blade aligns with a longitudinal axis of the drive shaft, the rod also having an aperture disposed substantially perpendicular to the blade slot and communicating with the blade slot, a blade guide rotatably mounted on the rod, the blade guide having a blade slot arranged and constructed to allow the blade projections to pass therethrough, wherein a cam surface is defined on at least a portion of an inner surface of the blade guide, a first stopper projecting from either one end of the cam surface or an outer surface of the rod, the first stopper defining a blade replacement position, and a pushpin slidably disposed within the rod aperture, the pushpin having a head portion slidably contacting the cam surface of the blade guide, thereby influencing the position of the pushpin with respect to a direction perpendicular to the longitudinal axis of the rod, wherein the pushpin is arranged and constructed to contact the first stopper and prevent the blade guide from pivoting beyond the blade replacement position.

2. An apparatus as in claim 1, further comprising a spring biasing the blade guide away from the blade replacement position and toward a blade locking position.

3. An apparatus as in claim 2, further comprising a second stopper projecting from either a second end of the cam surface or the outer surface of the rod, the second stopper defining an initial position, wherein the second stopper is arranged and constructed to contact the pushpin when a blade is not inserted in the blade guide and to limit further pivotal movement of the blade guide with respect to the rod.

4. An apparatus as in claim 1, wherein the cam surface is arranged and constructed to prevent the pushpin from actively pressing the blade when the blade guide pivots from the blade replacement position toward a push start position, which is a predetermined angle displaced from the blade replacement position, and wherein the cam surface is further arranged and constructed to push or urge the pushpin when the blade guide pivots past the push start position toward a blade locking position.

5. An apparatus as in claim 4, wherein a friction angle is defined between (1) a common normal at a contact point of the cam surface and the pushpin and (2) a line passing through the contact point and the rotational center axis of the cam surface, wherein the friction angle from the push start position to the blade locking position is between about 12–16°.

6. An apparatus as in claim 4, wherein a portion of a rounded edge of the blade slot is tapered, thereby serving to guide the blade into the blade slot of the rod.

7. An apparatus as in claim 1, further comprising a collar pivotally coupled to a housing of the tool, the collar comprising a tab for manual manipulation and a hook arranged and constructed to engage a tab defined on the blade guide, wherein the collar hook and the blade guide tab are arranged and constructed to engage when the collar is rotated or pivoted in an opening direction so as to rotate or pivot the blade guide to the blade replacement position and to disengage when the collar is disposed in a closed position.

8. An apparatus, comprising:

a rod having a first end arranged and constructed for attachment to a lower end of a tool drive shaft and a second end, the second end comprising a first blade slot defined to receive a blade so that a longitudinal axis of the blade aligns with a longitudinal axis of the drive shaft, wherein an aperture is disposed substantially perpendicular to the first blade slot and communicates with the first blade slot, a sleeve rotatably mounted on the rod, the sleeve having an initial position, a blade locking position and a blade replacement position, wherein a second blade slot is defined within the sleeve and is arranged and constructed to prevent the blade from passing when the sleeve is disposed in the blade locking position and permits the blade to pass when the sleeve is disposed in the blade replacement position, wherein a cam surface is defined on an inner surface of the sleeve, a first stopper projecting from either one end of the cam surface or from an outer surface of the rod, the first stopper defining the blade replacement position, and a pushpin slidably disposed within the rod aperture, the pushpin having a head portion slidably contacting the cam surface of the sleeve, thereby influencing the position of the pushpin with respect to a direction perpendicular to the longitudinal axis of the rod, wherein the pushpin is arranged and constructed to contact the first stopper and prevent the sleeve from pivoting beyond the blade replacement position.

9. An apparatus as in claim 8, further comprising a tool housing and a collar pivotally coupled to the tool housing, the collar at least partially surrounding the sleeve, the collar comprising a manually operable tab formed on an outer surface and a sleeve engaging means defined on an inner surface, wherein the sleeve further comprises a collar engaging means defined on an outer surface of the sleeve, the collar engaging means and the sleeve engaging means being arranged and constructed so as to engage when the collar is manually pivoted in an opening direction, whereby the sleeve is rotated to the blade replacement position, and to disengage when the collar is returned to a closed position, in which the sleeve does not contact the collar.

10. An apparatus as in claim 8, further comprising a torsion spring biasing the sleeve toward the initial position and away from the blade replacement position.

11. An apparatus as in claim 8, further comprising a second stopper projecting from either a second end of the cam surface or an outer surface of the rod, the second stopper defining the initial position, wherein the second stopper is arranged and constructed to contact the pushpin when a blade is not inserted in the first blade slot and to limit further pivotal movement of the sleeve with respect to the rod, whereby the first and second stoppers define the pivotal range of the sleeve with respect to the rod.

12. An apparatus as in claim 8, wherein the cam surface is arranged and constructed to prevent the pushpin from actively pressing the blade when the sleeve pivots from the blade replacement position toward a push start position, which push start position is disposed between the blade replacement position and the blade locking position, and wherein the cam surface is further arranged and constructed to push or urge the pushpin when the sleeve pivots past the push start position toward the black locking position.

13. An apparatus as in claim 12, wherein a friction angle is defined between (1) a common normal at a contact point of the cam surface and the pushpin and (2) a line passing through the contact point and the rotational center of the cam surface, wherein the friction angle from the push start position to the blade locking position is between about 12–16°.

14. An apparatus as in claim 8, wherein a portion of a rounded edge of the sleeve blade slot is tapered, thereby serving to guide the blade into the first blade slot.

15. An apparatus as in claim 14, further comprising:
a tool housing,
a collar pivotally coupled to the tool housing, the collar at least partially surrounding the sleeve, the collar comprising a manually operable tab formed on an outer surface and a sleeve engaging means defined on an inner surface, wherein the sleeve further comprises a collar engaging means defined on an outer surface of the sleeve, the collar engaging means and the sleeve engaging means being arranged and constructed so as to engage when the collar is manually pivoted in an opening direction, whereby the sleeve is rotated to the blade replacement position, and to disengage when the collar is returned to a closed position, in which the sleeve does not contact the collar, and
a torsion spring biasing the sleeve toward the initial position and away from the blade replacement position,
wherein the cam surface is arranged and constructed to prevent the pushpin from actively pressing the blade when the sleeve pivots from the blade replacement position toward a push start position, which push start position is defined between the blade replacement position and the blade locking position, and wherein the cam surface is further arranged and constructed to push or urge the pushpin when the sleeve pivots past the push start position, wherein a friction angle is defined between (1) a common normal at a contact point of the cam surface and the pushpin and (2) a line passing through the contact point and the rotational center of the cam surface, the friction angle extending from the push start position to the blade locking position is between about 12–16° and
wherein the pushpin and rod aperture are arranged and constructed such that the pushpin is restricted from rotating with the rod aperture, the pushpin further comprising a tapered edge disposed so as to contact the blade when the blade is inserted into the blade slot.

16. A reciprocating power tool, comprising:
a tool housing,
a reciprocating drive shaft partially extending from the tool housing,
a rod having a first end attached to the drive shaft and a second end comprising a first blade slot defined to receive a blade so that a longitudinal axis of the blade aligns with a longitudinal, reciprocating axis of the drive shaft, wherein an aperture is disposed substantially perpendicular to the first blade slot and communicates with the blade slot,
a sleeve rotatably mounted on the rod and comprising a collar engaging means defined on an outer surface of the sleeve, the sleeve being pivotable between an initial position and a blade replacement position, wherein a blade locking position is defined between the initial position and the blade replacement position, wherein a second blade slot is defined within the sleeve and is arranged and constructed to prevent the blade from passing when the sleeve is disposed in the blade locking position and permits the blade to pass when the sleeve is disposed in the blade replacement position, wherein a cam surface is defined on an inner surface of the sleeve,
a first stopper projecting from either one end of the cam surface or from the rod, the first stopper defining the blade replacement position,
a pressing member slidably disposed within the rod aperture, the pressing member having a contact portion slidably contacting the cam surface, wherein the cam surface and pressing member are arranged and constructed such that the cam surface urges the pressing member further into the rod aperture and the rod blade slot when the sleeve is pivoted toward the blade locking position and the pressing member contacts the first stopper in the blade replacement position, thereby preventing the sleeve from pivoting beyond the blade replacement position, and
a collar pivotally coupled to the tool housing, the collar at least partially surrounding the sleeve and the reciprocating drive shaft, the collar comprising a manually operable tab formed on an outer surface and a sleeve engaging means defined on an inner surface, the collar engaging means and the sleeve engaging means being arranged and constructed so as to engage when the collar is manually pivoted in an opening direction, whereby the sleeve is rotated toward the blade replacement position, and to disengage when the collar is returned to a closed position, in which the sleeve does not contact the collar.

17. An apparatus as in claim 16, further comprising a torsion spring biasing the sleeve toward the initial position and away from the blade replacement position.

18. An apparatus as in claim 17, further comprising a second stopper projecting from either a second end of the cam surface or the rod, the second stopper defining the initial position, wherein the second stopper is arranged and constructed to contact the pressing member when a blade is not inserted in the blade slot and to limit further pivotal movement of the sleeve with respect to the rod, whereby the first and second stoppers define the pivotal range of the sleeve with respect to the rod.

19. An apparatus as in claim 17, wherein the cam surface is arranged and constructed to prevent the pressing member from actively pressing the blade when the sleeve pivots from the blade replacement position toward a push start position, which is a predetermined angle displaced from the blade replacement position, and wherein the cam surface is further arranged and constructed to push or urge the pushpin when the sleeve pivots past the push start position toward the blade locking position.

20. An apparatus as in claim 19, wherein a friction angle is defined between (1) a common normal at a contact point of the cam surface and the pressing member and (2) a line passing through the contact point and the rotational center of the cam surface, wherein the friction angle from the push start position to the blade locking position is between about 12–16°.

21. An apparatus as in claim 20, wherein the pressing member and rod aperture are arranged and constructed such that the pressing member is restricted from rotating with the rod aperture, the pressing member further comprising a tapered edge disposed so as to contact the blade when the blade is inserted into the blade slot.

22. A blade clamp (26, 110), comprising:
means (37, 112) for receiving a blade (22) and attaching to a drive shaft (24) of a tool (10), the blade receiving means comprising a first blade slot (37a, 112a) defined to receive the blade so that a longitudinal axis of the blade aligns with a longitudinal axis of the drive shaft, wherein an aperture (37b, 112b) is disposed substantially perpendicular to the first blade slot and communicates with the first blade slot,
a sleeve (33, 115) rotatably mounted on the blade receiving means, the sleeve having an initial position, a blade locking position and a blade replacement position, wherein a second blade slot (33f, 33k, 115b) is defined within the sleeve and is arranged and constructed to prevent the blade from passing when the sleeve is disposed in the blade locking position and permits the blade to pass into or from the first blade slot when the sleeve is disposed in the blade replacement position, wherein a cam surface (33c, 116) is defined on an inner surface of the sleeve,
a first stopping means (33e, 116d) projecting either from one end of the cam surface or from an outer surface of the rod, the first stopping means defining the blade replacement position, and
means (42, 113) for pressing the blade, the blade pressing means being slidably disposed within the rod aperture and including means (42b, 113c) for slidably contacting the cam surface, thereby influencing the position of the blade pressing means with respect to a direction perpendicular to the longitudinal axis of the rod, wherein the blade pressing means contacts the first stopping means in order to prevent the sleeve from pivoting beyond the blade replacement position.

23. A blade clamp as in claim 22, further comprising a second stopping means (33d) projecting from either a second end of the cam surface or an outer surface of the rod, the second stopping means defining the initial position, wherein the second stopping means contacts the blade pressing means when a blade is not inserted within the blade receiving means in order to limit further pivotal movement of the sleeve with respect to the blade receiving means, whereby the first and second stopping means define the pivotal range of the sleeve with respect to the blade receiving means.

24. A blade clamp as in claim 22, wherein the cam surface includes a first cam surface (116a) that increasingly urges the pressing means toward the blade when the sleeve pivots through a first range of rotation (C1) from a push start position toward the blade locking position, and a second cam surface (116b) that does not actively press the blade pressing means against the blade when the sleeve pivots through a second range of rotation (C2) between the push start position and the blade replacement position, the push start position being disposed between the blade replacement position and the blade locking position.

25. A blade clamp as in claim 24, wherein a friction angle F is defined between (1) a common normal at a contact point P of the cam surface and the blade pressing means and (2) a line passing through the contact point and the rotational center of the cam surface, wherein the friction angle from the push start position to the blade locking position is between 12–16°.

26. A blade clamp as in claim 22, wherein the second blade slot includes a tapered portion (115h) that serves to guide the blade into the first blade slot.

27. A blade clamp as in claim 22, further comprising a torsion spring (44, 118) biasing the sleeve toward the initial position and away from the blade replacement position.

28. A blade clamp as in claim 22, wherein the blade pressing means is restricted from rotating within the aperture of the blade receiving means and the blade pressing means further comprises a tapered edge (42c, 113b) disposed so as to contact the blade when the blade is inserted through the second blade slot.

29. A tool (10) comprising:
a blade clamp as in claim 22,
a tool housing (12) and
a collar (52, 130) pivotally coupled to the tool housing, the collar at least partially surrounding the sleeve, the collar comprising a tab (52b, 130b) and a sleeve engaging means (52d, 130c) defined on an inner surface,
wherein the sleeve further comprises a collar engaging means (33g, 33h, 115d) defined on an outer surface of the sleeve, the sleeve engaging means engaging the collar engaging means when the collar is pivoted in an opening direction, whereby the sleeve is rotated to the blade replacement position, and disengaging from the collar engaging means when the collar is returned to a closed position, in which the sleeve does not contact the collar.

30. A reciprocating power tool (10), comprising:
a tool housing (12),
a reciprocating drive shaft (24) partially extending from the tool housing,
a rod (37, 112) having a first end attached to the drive shaft and a second end comprising a first blade slot (37a, 112a) defined to receive a blade (22) so that a longitudinal axis of the blade aligns with a longitudinal, reciprocating axis of the drive shaft, wherein an aperture (37b, 112b) is disposed substantially perpendicular to the first blade slot and communicates with the first blade slot,
a sleeve (33, 115) rotatably mounted on the rod and comprising a collar engaging means (33g, 33h, 115d) defined on an outer surface of the sleeve, the sleeve being pivotable between an initial position and a blade replacement position, wherein a blade locking position is defined between the initial position and the blade replacement position, and wherein a second blade slot (33f, 33k, 115b) is defined within the sleeve, the first and second blade slots being arranged and constructed to prevent the blade from passing when the sleeve is disposed in the blade locking position and to permit the blade to pass when the sleeve is disposed in the blade replacement position, wherein a cam surface (33c, 116) is defined on an inner surface of the sleeve, a first stopper (33e, 116d) projecting from either one end of the cam surface or from the rod, the first stopper defining the blade replacement position, a pushpin (42, 113) slidably disposed within the rod aperture, the pushpin having a contact portion (42a, 113b) slidably contacting the cam surface, wherein the cam surface urges the pushpin further into the rod aperture and the first blade slot when the sleeve is pivoted toward the blade locking position and the pushpin contacts the first stopper in the blade replacement position, thereby preventing the sleeve from pivoting beyond the blade replacement position, and a collar (52, 130) pivotally coupled to the tool housing, the collar at least partially surrounding the sleeve and the reciprocating drive shaft, the collar comprising a sleeve engaging means (52d, 130c) defined on an inner surface, the sleeve engaging means engaging the collar engaging means when the collar pivots in an opening direction, whereby the sleeve is rotated toward the blade replacement position, and disengaging from the collar engaging means when the collar is returned to a closed position, in which the sleeve does not contact the collar.

31. An apparatus as in claim 30, further comprising a torsion spring (44, 118) biasing the sleeve toward the initial position and away from the blade replacement position and the collar further comprises a manually operable tab (52b, 130b) for pivoting the collar in the opening direction.

* * * * *